United States Patent [19]
Mizuno

[11] Patent Number: 5,847,594
[45] Date of Patent: Dec. 8, 1998

[54] SOLID-STATE IMAGE SENSING DEVICE

[75] Inventor: Seiichiro Mizuno, Hamamatsu, Japan

[73] Assignee: Hamamatsu Photonics K.K., Hamamatsu, Japan

[21] Appl. No.: 845,427

[22] Filed: Apr. 25, 1997

[30] Foreign Application Priority Data

Apr. 26, 1996 [JP] Japan .................................. 8-108250
Apr. 30, 1996 [JP] Japan .................................. 8-109865

[51] Int. Cl.⁶ .................................................. H01G 9/20
[52] U.S. Cl. ........................ 327/514; 327/337; 327/345
[58] Field of Search ................................. 327/514, 515, 327/337, 344, 345

[56] References Cited

U.S. PATENT DOCUMENTS

| | | | |
|---|---|---|---|
| 3,609,542 | 9/1971 | Burke | 324/111 |
| 4,893,088 | 1/1990 | Myers et al. | 328/127 |
| 5,142,286 | 8/1992 | Ribner et al. | 341/143 |
| 5,198,660 | 3/1993 | Yokoyama et al. | 250/214 A |
| 5,303,027 | 4/1994 | Kuderer et al. | 356/328 |
| 5,307,145 | 4/1994 | Schenkel et al. | 356/215 |
| 5,367,154 | 11/1994 | Pfeiffer | 250/208.1 |

FOREIGN PATENT DOCUMENTS 6-237175  8/1994  Japan .

OTHER PUBLICATIONS

Graverick et al, "A 32–Channel Charge Readout IC for Programmable, Nonlinear Quantization of Multichannel Detector Data", Journal of Solid–State Circuits, vol. 30, No. 5, May 1995, pp. 533–541.
"20–Bit Analog–To–Digital Converter", Burr–Brown DDC101, 1993 Burr–Brown Corporation, pp. 1–28.

*Primary Examiner*—Timothy P. Callahan
*Assistant Examiner*—An T. Luu
*Attorney, Agent, or Firm*—Pillsbury Madison & Sutro LLP

[57] ABSTRACT

When a photodiode receives light, it produces a charge corresponding to the intensity of light, and outputs it as a current signal. The current signal is input to an integral circuit constituted by a feedback capacitive element and a charge amplifier, and is integrated by time. On the other hand, a step charge generator generates a charge corresponding to one of reference voltage levels +Vref and −Vref in response to first and second clock signals CLK1 and CLK2, and supplies the charge to the feedback capacitive element in synchronism with the clock signal. The integral circuit executes an integral operation by accumulating the charge produced by the photodiode, and supplies a step charge, thus executing $\Sigma\Delta$ modulation. An AD conversion result is obtained from the $\Sigma\Delta$ modulation result. In this manner, high-precision digital data is output in correspondence with the intensity of light by the photodiode with a simple circuit arrangement.

15 Claims, 13 Drawing Sheets

SOLID-STATE IMAGE SENSING DEVICE

BACKGROUND OF THE INVENTION

1. Field of the Invention

The present invention relates to a solid-state image sensing device which outputs the intensity of light by a photodiode as digital data.

2. Related Background Art

In recent years, MOS solid-state image sensing devices with, e.g., a photoelectric conversion function have been developed along with spread of the image processing technique, and various types of solid-state image sensing devices comprising such devices are known. In order to meet requirements for higher-resolution images, each photodiode that constitutes a pixel upon image sensing tends to be miniaturized, and a large number of photodiodes tend to be used to assure a large image sensing area.

However, as the number of photodiodes increases, the number of analog-to-digital converters (to be referred to as AD converters hereinafter) each for converting an analog value, i.e., the intensity of light by each photodiode into a digital value as a data form suitable for image processing calculations inevitably increases to attain high-speed processing.

In view of this problem, a technique for integrating and arraying charge amplifiers for amplifying a charge output from each photodiode as a current signal and AD converters to attain a low-cost, compact device has been proposed. In such proposal, since the circuit system of charge amplifiers has nearly been established, the integration techniques mostly concern themselves on the circuit system of A/D converters.

One of such proposals has been made in "S. L. Garverick et al., *Journal of Solid-State Circuits,* Vol. 30, No. 5, May 1995, pp. 533–541" (to be referred to as prior art 1 hereinafter). In prior art 1, a charge generated in each photodiode by incident light reception is stored in a feedback capacitive element and is converted into a voltage signal using a charge amplifier, and this voltage value is held. Thereafter, comparison with the voltage value of a voltage signal which is common to the entire array and changes in a stairstep form is sequentially performed (by a so-called dual-slope AD conversion method), thus attaining AD conversion.

Burr-Brown Corporation announced model "DDC101" (to be referred to as prior art 2 hereinafter) as an AD converter exclusively used for reading a charge from a CT (Computer Tomography) photodiode. In prior art 2, the principle of a $\Delta$ modulator is applied to AD conversion, and operations are performed in synchronism with high-speed clocks with a cycle shorter by two to three orders of magnitudes than the integral time.

More specifically, step voltages which are switched at clock cycles of the high-speed clock signal are generated at short intervals and are applied to a capacitive element. The amount of changes in accumulated charge in the capacitance as a result of application of the voltages is compared with the charge amount from the photodiode, and any overflowing or underflowing charge amount is corrected in the next clock cycle. In accordance with the comparison result in each clock cycle, a digital signal pulse sequence of "0"s or "1"s is generated. The digital signal pulse sequence is supplied to a digital filter (e.g., an FIR filter) to obtain a high-precision AD conversion result.

Also, a technique that applies the principle of a $\Sigma\Delta$ modulator to AD conversion is disclosed in "R. H. Nixon et al., Proc. SPIE, vol. 1900, 1993, pp. 31–39" (to be referred to as prior art 3 hereinafter). In prior art 3, the amount of charge produced in a photodiode corresponding to each pixel is converted into a voltage signal, and the voltage signal is held. Linear $\Sigma\Delta$ modulation is performed for the holding result using a single $\Sigma\Delta$ modulator, and the total number of pulses "1" in a digital signal pulse sequence of "0"s or "1"s as the modulation result is counted by a counter, thus obtaining an AD conversion value.

Furthermore, the technique of an AD converter to which the principle of a $\Sigma\Delta$ modulator is applied is disclosed in Japanese Patent Laid-Open No. 6-237175 (to be referred to as prior art 4 hereinafter). In prior art 4, a voltage signal is input, and is subjected to quadratic $\Sigma\Delta$ modulation using two $\Sigma\Delta$ modulators to output a digital signal pulse sequence of "0"s or "1"s as the modulation result. Also, a voltage signal corresponding to the total number of "1"s in the digital signal pulse sequence as an AD conversion result is generated by a DA converter and is applied as a reference voltage of the $\Sigma\Delta$ modulators, thus removing offsets of the $\Sigma\Delta$ modulators.

SUMMARY OF THE INVENTION

It is an object of the present invention to provide a solid-state image sensing device which outputs high-precision digital data in correspondence with the intensity of light by a photodiode by a simple circuit arrangement.

A solid-state image sensing device according to the present invention adopts $\Sigma\Delta$ modulation, and also adopts a direct current input scheme which is hardly influenced by the offset voltage level of a $\Sigma\Delta$ modulator upon inputting a signal, thus realizing a solid-state image sensing device that can output high-precision digital data.

More specifically, a solid-state image sensing device of the present invention comprises: (a) a photodiode for producing a charge in correspondence with an intensity of light thereby, the photodiode having a first terminal set at a first reference voltage level and a second terminal for outputting the produced charge, and the first reference voltage level falling within a range between second and third reference voltage levels; (b) a first feedback capacitive element having a first terminal which directly receives the charge output from the second terminal of the photodiode; (c) a first amplifier having a signal input terminal connected to the first terminal of the first feedback capacitive element, the signal input terminal of the first amplifier being virtually set at the first reference voltage level, and an output terminal of the first amplifier being connected to a second terminal of the first feedback capacitive element; (d) a first step charge generator which produces a step charge on the basis of the first and second reference voltage levels, and supplies the step charge to the first feedback capacitive element; (e) a voltage comparator which receives a first integral voltage signal output from the first amplifier, compares a voltage of the first integral voltage signal with the first reference voltage level, and outputs a comparison result signal; (f) a binary sampling circuit which receives the comparison result signal, and samples the comparison result signal to binarize the comparison result signal; and (g) a fundamental timing generation circuit which generates a first clock signal and a second clock signal which is at logical false level when the first clock signal is at logical truth level, and changes to logical truth level during a period included in a logical false level period of the first clock signal, outputs the first and second clock signals to the first step charge generator, and outputs the first clock signal to the binary sampling circuit.

Note that the solid-state image sensing device of the present invention preferably further comprises a first step charge generation control circuit which receives an output signal from the binary sampling circuit, and outputs the output signal from the binary sampling circuit and an inverted signal of the output signal from the binary sampling circuit to the first step charge generator as a step charge generation instruction.

In the solid-state image sensing device of the present invention, when the photodiode receives light, a charge corresponding to the amount of received light is produced, and is output as a current signal. The current signal is input to a first integral circuit constituted by the first feedback capacitive element and the first charge amplifier, and is integrated by time.

The second terminal of the photodiode is directly electrically connected to the first terminal of the first feedback capacitive element and the signal input terminal of the first charge amplifier, and the current integral effect itself is not essentially influenced by the offset voltage. For this reason, the voltage value output as a result of the integral operation has no influence of the offset voltage.

Note that "directly inputting a charge" or "directly electrically connected" means that no element (a resistive element, inductor element, capacitive element, amplifier, attenuator, or the like) that changes the signal form is present in the signal transmission path, i.e., that no elements are inserted in the signal transmission path and a switch alone is inserted in the signal transmission path upon signal transmission.

On the other hand, the first step charge generator generates a charge in correspondence with one of the first and second reference voltage levels in response to the first and second clock signals supplied from the fundamental timing generation circuit, and injects the charge into the first feedback capacitive element (or removes the charge on the first feedback capacitive element from it) in synchronism with the clock signals. As for charge generation, a charge corresponding to one of the first and second reference voltage levels is preferably generated in accordance with the output signal and its inverted signal supplied from the binary sampling circuit.

In this manner, the first integral circuit executes the integral operation by accumulating charges produced by the photodiode in the first feedback capacitive element, while it further accumulates or removes charges in or from the first feedback capacitive element at cycles of the timing signals generated by the fundamental timing generation circuit, thereby executing ΣΔ modulation. The ΣΔ modulation result is obtained as the output signal from the first integral circuit as the output voltage of the first charge amplifier in correspondence with the charge amount accumulated in the first feedback capacitive element. That is, the first integral circuit and the first step charge generator constitute a current-input first ΣΔ modulator free from any influence of the offset voltage.

The first integral voltage signal output from the first charge amplifier is input to the voltage level comparator. The voltage level comparator compares the voltage level of the input first integral voltage signal with the third reference voltage level, and outputs a binary comparison result signal corresponding to the comparison result. This comparison signal is input to the binary sampling circuit, and is sampled at the same cycles as those of the timing signals generated by the fundamental timing generation circuit (e.g., in synchronism with the first clock signals), thus outputting a digital signal sequence representing "0"s or "1"s. By processing this digital signal sequence (e.g., by counting the number of "1"s during the integral period), an AD conversion result can be obtained.

The solid-state image sensing device of the present invention preferably further comprises a dark current removing circuit for removing a dark current of the photodiode.

Note that the dark current removing circuit may comprise: (i) a field effect transistor which has a source terminal connected to the signal input terminal of the first amplifier and a drain terminal set at the first reference voltage level; (ii) a dark current storage capacitive element which has a first terminal connected to a gate terminal of the field effect transistor and a second terminal set at the first reference voltage level; and (iii) a current holding switch which has a first terminal connected to the first terminal of the dark current storage capacitive element and a second terminal connected to the output terminal of the first amplifier.

In the solid-state image sensing device with the dark current removing circuit, prior to receiving light, the photodiode is set in a non-light-receiving state for a predetermined period as a dark current detection period, and dark currents are detected for this period. The detected dark current is stored in the dark current removing circuit, and the same current as the stored dark current is always removed from currents input to the charge amplifier.

For example, the current holding switch is closed while setting the photodiode in the non-light-receiving state, and a voltage corresponding to dark currents produced at that time is generated by the dark current storage capacitive element. Since this voltage is applied to the gate terminal of the field effect transistor, dark currents flow through the source-drain path of the field effect transistor.

Subsequently, when the current holding switch is opened, the voltage generated by the dark current storage capacitive element is held at that time, and dark currents are then removed from currents to be input to the charge amplifier. Thereafter, image sensing is executed in this state.

In the solid-state image sensing device of the present invention, the first step charge generator may comprise: (i) a first switch which has a first terminal set at the second reference voltage level and is opened/closed in response to the output signal from the binary sampling circuit; (ii) a second switch which has a first terminal set at the third reference voltage level and is opened/closed in response to the inverted signal of the output signal from the binary sampling circuit; (iii) a third switch which has a first terminal set at the first reference voltage level and is opened/closed in response to the first clock signal; (iv) a fourth switch which has a first terminal set at the first reference voltage level and is opened/closed in response to the first clock signal; (v) a first step charge generation capacitive element which has a first terminal connected to a second terminal of the third switch and a second terminal connected to a second terminal of the fourth switch; (vi) a fifth switch which has a first terminal connected to the first terminal of the first step charge generation capacitive element and a second terminal connected to the signal input terminal of the first amplifier, and is opened/closed in response to the second clock signal; and (vii) a sixth switch which has a first terminal connected to second terminals of the first and second switches and a second terminal connected to the second terminal of the first step charge generation capacitive element, and is opened/closed in response to the second clock signal.

According to the above-mentioned first step charge generator, when the first clock signal changes to logical truth level, the third and fourth switches are closed, and the voltage level across the two terminals of the first step charge generation capacitive element is set at the third reference voltage level. As a consequence, the charge accumulated in the first step charge generation capacitive element becomes zero. After the first clock signal changes to logical truth level and the third and fourth switches are opened, when the second clock signal changes to logical truth level, the fifth and sixth switches are closed. Consequently, a step charge corresponding to one of the first and second reference voltage level is generated in the first step charge generation capacitive element.

A charge corresponding to the step charge is supplied to or removed from the first feedback capacitive element in accordance with generation of the step charge. As a result, the first step charge generator can appropriately execute $\Sigma\Delta$ modulation in cooperation with the first integral circuit described above.

The solid-state image sensing device of the present invention preferably further comprises, between the first amplifier and the voltage comparator: (a) a signal sampling circuit which samples the first integral voltage signal at an instructed timing, and outputs an AC component signal; (b) a feedback capacitance circuit having a second feedback capacitive element which receives a signal output from the signal sampling circuit at a first terminal thereof; (c) a second amplifier which receives the signal output from the signal sampling circuit at a signal input terminal thereof, an output terminal of the second amplifier being connected to the feedback capacitance circuit; and (d) a second step charge generator which generates a step charge on the basis of the second and third reference voltage levels and supplies the step charge to the second feedback capacitive element, and the voltage comparator receives a second integral voltage signal output from the second amplifier.

Note that the solid-state image sensing device of the present invention preferably further comprises a second step charge generation control circuit which receives an output signal from the binary sampling circuit, and outputs the output signal from the binary sampling circuit and an inverted signal of the output signal from the binary sampling circuit to the first and second step charge generators as a step charge generation instruction.

In this solid-state image sensing device, a second integral circuit constituted by the feedback amplifier circuit and the second charge amplifier, and the second charge generator, constitute a voltage-input second $\Sigma\Delta$ modulator.

The modulation result output from the first $\Sigma\Delta$ modulator is further $\Sigma\Delta$-modulated by the second $\Sigma\Delta$ modulator. As a consequence, changes in output reference voltage level caused by current emission by the photodiode can be eliminated. Consequently, a high-precision AD change value can be obtained by comparison with the third reference voltage level later.

In this solid-state image sensing device, the output signal from the first $\Sigma\Delta$ modulator is sampled by the signal sampling circuit in synchronism with the first and second clock signals, and charges produced as a result of sampling are accumulated and integrated by the second integral circuit.

On the other hand, the second step charge generator generates a charge corresponding to one of the first and second reference voltage levels in response to the first and second clock signals supplied from the fundamental timing generation circuit, and injects a charge into the second feedback capacitive element (or removes the charge on the second feedback capacitive element from it) in synchronism with the clock signals. As for charge generation, a charge corresponding to one of the first and second reference voltage levels is preferably generated in accordance with the output signal and its inverted signal supplied from the binary sampling circuit.

In this manner, the second integral circuit executes the integral operation by accumulating charges produced by sampling the output from the first $\Sigma\Delta$ modulator in the second feedback capacitive element, while it further accumulates or removes charges in or from the second feedback capacitive element at cycles of the timing signals generated by the fundamental timing generation circuit, thereby executing $\Sigma\Delta$ modulation. The $\Sigma\Delta$ modulation result is obtained as the output signal from the second integral circuit as the output voltage of the second charge amplifier in correspondence with the charge amount accumulated in the second feedback capacitive element.

The second integral voltage signal output from the second charge amplifier is input to the voltage level comparator. The voltage level comparator compares the voltage level of the input second integral voltage signal with the third reference voltage level, and outputs a binary comparison result signal corresponding to the comparison result. This comparison signal is input to the binary sampling circuit, and is sampled at the same cycles as those of the timing signals generated by the fundamental timing generation circuit (e.g., in synchronism with the first clock signals), thus outputting a digital signal sequence representing "0"s or "1"s. By processing this digital signal sequence (e.g., by counting the number of "1"s during the integral period), an AD conversion result can be obtained.

In the solid-state image sensing device in which the $\Sigma\Delta$ modulators are connected in series with each other, the signal sampling circuit may comprise: (i) a first switch which has a first terminal connected to the output terminal of the first amplifier and is opened/closed in response to the first clock signal; and (ii) a signal transmission capacitive element which has a first terminal connected to a second terminal of the first switch and a second terminal connected to the signal input terminal of the second amplifier.

In this case, the second step charge generator preferably comprises: (i) a second switch which receives the second reference voltage level at a first terminal thereof and is opened/closed in response to the output signal from the binary sampling circuit; (ii) a third switch which receives the third reference voltage level at a first terminal thereof and is opened/closed in response to the inverted signal of the output signal from the binary sampling circuit; and (iii) a fourth switch which has a first terminal connected to second terminals of the second and third switches, and a second terminal connected to the first terminal of the signal transmission capacitive element, and is opened/closed in response to the second clock signal, and the feedback capacitance circuit preferably comprises: (i) a second feedback capacitive element having a first terminal connected to the signal input terminal of the second amplifier; (ii) a fifth switch which has a first terminal connected to a second terminal of the second feedback capacitive element and a second terminal connected to the output terminal of the second amplifier, and is opened/closed in response to the inverted signal of the first clock signal; and (iii) a sixth switch which has a first terminal connected to the signal input terminal of the second amplifier and a first terminal connected to the output terminal of the second amplifier, and is opened/closed in response to the first clock signal.

According to the combination of the signal sampling circuit, second step charge generator, and feedback capacitance circuit, the sixth switch is closed to short-circuit the input and output terminals of the second amplifiers while the output signal from the first ΣΔ modulator is sampled by the signal sampling circuit, thus generating an offset voltage. However, during this period, since the fifth switch is open, the charge accumulated in the second feedback capacitive element remains there. On the other hand, since the second terminal of the signal transmission capacitive element remains connected to the input terminal of the second amplifier, it is kept applied with the offset voltage. Accordingly, after the sixth switch is opened, even when the fifth switch is closed in response to the second clock signal and transits to the state for accumulating a charge in the second feedback capacitive element, no influence of the offset voltage appears. In this manner, offset-free ΣΔ modulation can be executed.

In the solid-state image sensing device in which the ΣΔ modulators are connected in series with each other, the signal sampling circuit may comprise: (i) a first switch which has a first terminal connected to the output terminal of the first amplifier and is opened/closed in response to the first clock signal; (ii) a signal transmission capacitive element which has a first terminal connected to a second terminal of the first switch; (iii) a second switch which has a first terminal connected to a second terminal of the signal transmission capacitive element and a second terminal connected to the signal input terminal of the second amplifier, and is opened/closed in response to the second clock signal; (iv) a third switch which has a first terminal set at the first reference voltage level and a second terminal connected to the first terminal of the signal transmission capacitive element, and is opened/closed in response to the second clock signal; and (v) a fourth switch which has a first terminal set at the first reference voltage level and a second terminal connected to the second terminal of the signal transmission capacitive element, and is opened/closed in response to the first clock signal.

In this case, the second step charge generator preferably comprises: (i) a fifth switch which has a first terminal set at the second reference voltage level, and is opened/closed in response to the output signal from the binary sampling circuit; (ii) a sixth switch which has a first terminal set at the third reference voltage level, and is opened/closed in response to the inverted signal of the output signal from the binary sampling circuit; (iii) a seventh switch which has a first terminal set at the first reference voltage level, and is opened/closed in response to the first clock signal; (iv) an eighth switch which has a first terminal set at the first reference voltage level, and is opened/closed in response to the first clock signal; (v) a second step charge generation capacitive element which has a first terminal connected to a second terminal of the seventh switch and a second terminal connected to a second terminal of the eighth switch; (vi) a ninth switch which has a first terminal connected to the first terminal of the second step charge generation capacitive element and a second terminal connected to the signal input terminal of the second amplifier, and is opened/closed in response to the second clock signal; and (vii) a tenth switch which has a first terminal connected to second terminals of the fifth and sixth switches and a second terminal connected to the second terminal of the second step charge generation capacitive element, and is opened/closed in response to the second clock signal, and the feedback capacitance circuit preferably comprises the second feedback capacitive element which has the first terminal connected to the signal input terminal of the second amplifier and a second terminal connected to the output terminal of the second amplifier.

According to the combination of the signal sampling circuit, second step charge generator, and feedback capacitance circuit, when the signal sampling circuit samples the output signal from the first ΣΔ modulator after the first and fourth switches are closed in response to the first clock signal, the second terminal of the signal transmission capacitive element is set at the first reference voltage level. After the first and fourth switches are opened, while the second and third switches are closed in response to the second clock signal and a charge is being transferred to the second feedback capacitive element, the first terminal of the signal transmission capacitive element is set at the first reference voltage level. Accordingly, no offset voltage difference is produced between the sampling and charge transfer states, and ΣΔ modulation free from any influence of the offset voltage can be executed.

The solid-state image sensing device of the present invention may further comprise a digital filter circuit which receives a digital signal sequence output from the binary sampling circuit, and outputs a digitally filtered data signal.

According to this solid-state image sensing device, since final data is obtained by digitally filtering the digital data signal sequence output from the binary sampling circuit, high-precision AD conversion can be executed.

In the solid-state image sensing device of the present invention, capacitances of the first feedback capacitive element and the first step charge generation capacitive element are preferably selected in correspondence with time characteristics of an output current from the photodiode.

According to this solid-state image sensing device, since the capacitances of the first feedback capacitive element and the first step charge generation capacitive element are selected in correspondence with the current range of the photodiode to be used in terms of the conversion precision and conversion speed, optimal conversion precision and speed can be attained. Note that pairs of different types of first feedback capacitive elements and first step charge generation capacitive elements, each pair of which has a predetermined ratio between the capacitances of the first feedback capacitive element and the first step charge generation capacitive element, are preferably prepared to allow selection of a desired one from these pairs.

The solid-state image sensing device of the present invention may comprise a plurality of photodiodes, which are arranged in a one- or two-dimensional array, and may further comprise a selection circuit for selecting one of the photodiodes to be connected to the first terminal of the first feedback capacitive element.

Note that the selection circuit can select the photodiodes (i) in a predetermined order or (ii) in a random order.

According to this solid state image-sensing device, since the single AD converter performs AD conversion associated with a plurality of photodiodes, the number of AD converters to be mounted can be reduced, and easy integration can be attained.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications

DETAILED DESCRIPTION OF THE PREFERRED EMBODIMENTS

Figure 1:
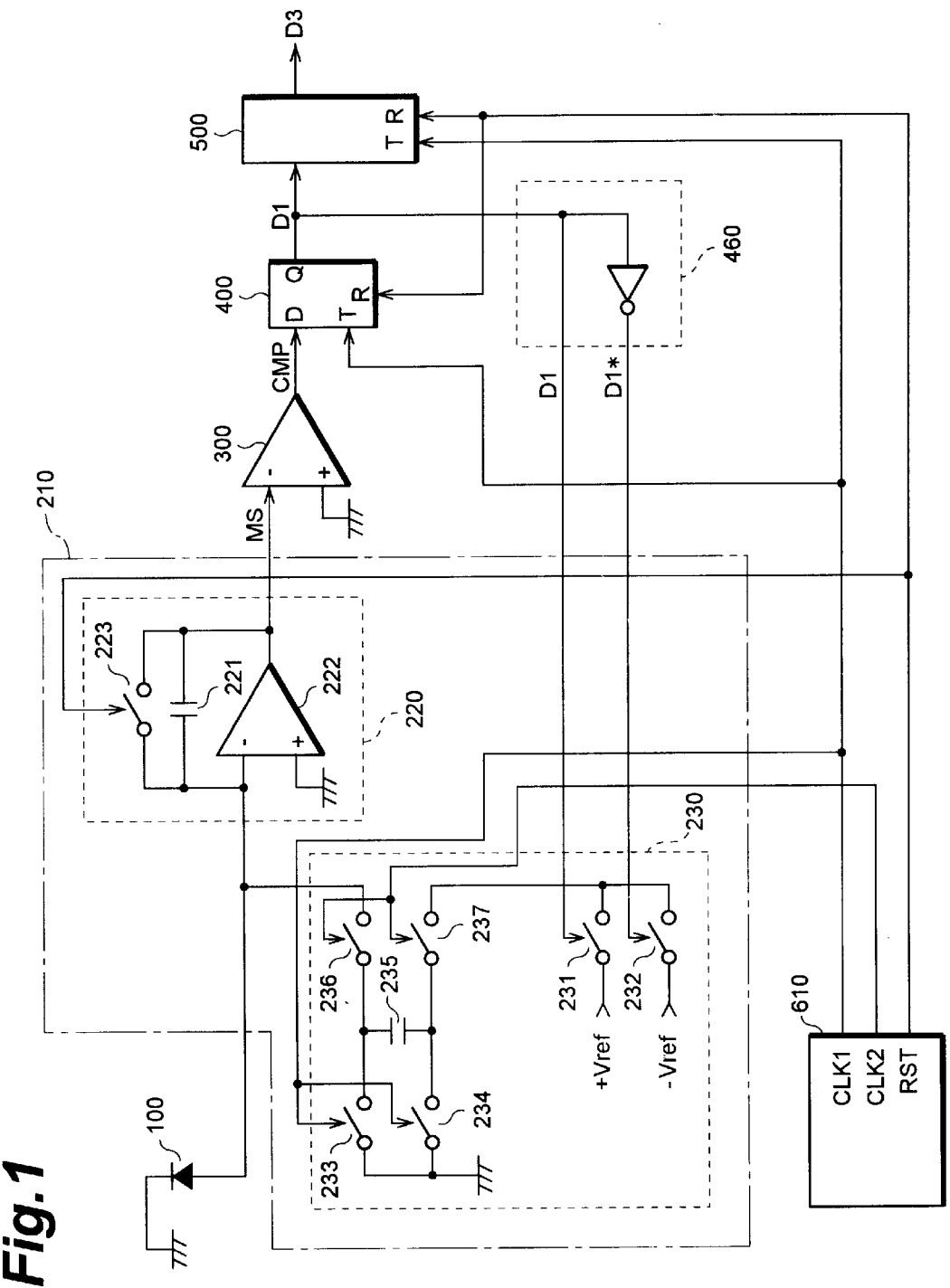
FIG. 1 is a circuit diagram showing the arrangement of a solid-state image sensing device according to the first embodiment of the present invention.

Some embodiments of a solid-state image sensing device of the present invention will be described hereinafter with reference to the accompanying drawings. Note that the same reference numerals denote the same parts throughout the drawings, and a repetitive description thereof will be avoided.

(First Embodiment)

FIG. 1 is a circuit diagram showing the arrangement of a solid-state image sensing device according to the first embodiment of the present invention. In this embodiment, AD conversion is executed by performing $\Sigma\Delta$ modulation using a single $\Sigma\Delta$ modulator. As shown in FIG. 1, the solid-state image sensing device of this embodiment comprises (a) a photodiode 100, the cathode of which is connected to ground, and which produces a charge in correspondence with the received light amount and outputs the charge from the anode, (b) a $\Sigma\Delta$ modulator 210 which receives the current signal output from the photodiode 100, and integrates and $\Sigma\Delta$-modulates the input charge, (c) a comparator 300 which receives a modulated signal MS output form the $\Sigma\Delta$ modulator 210, compares the voltage level of the modulated signal MS with the ground voltage level, and outputs a binary comparison result signal CMP corresponding to the comparison result, (d) a binary sampling circuit 400 which receives the comparison result signal CMP, samples the signal CMP in synchronism with a clock signal CLK1, and outputs a binary digital signal D1, (e) a step charge generation control circuit 460 which receives the signal D1, and outputs the signal D1 and an inverted signal D1* of the signal D1 to the $\Sigma\Delta$ modulator 210, (f) a digital filter circuit 500 which receives the digital signal D1 and digitally filters the signal D1 to obtain an AD conversion result, and (g) a fundamental timing generation circuit 610 which generates a clock signal CLK1 and a clock signal CLK2, which is at logical false level when the clock signal CLK1 is at logical truth level, and changes to logical truth level during a period included in the logical false level period of the clock signal CLK1, outputs the clock signals CLK1 and CLK2 to the $\Sigma\Delta$ modulator 210, and outputs the clock signal CLK1 and a reset signal to the binary sampling circuit 400 and the digital filter circuit 500.

The $\Sigma\Delta$ modulator 210 comprises (i) an integral circuit 220 for accumulating and integrating a charge from the photodiode 100, and (ii) a step charge generator 230 which generates a step charge on the basis of reference voltage levels +Vref and −Vref in synchronism with the clock signals CLK1 and CLK2, and supplies the charge to the integral circuit 220.

The integral circuit 220 comprises (i) a feedback capacitive element 221 (capacitance=C11) having a first terminal which is directly electrically connected to the current output terminal of the photodiode 100, (ii) an operational amplifier 222 having an inverting input terminal which is directly electrically connected to the current output terminal of the photodiode 100, a non-inverting input terminal which is connected to ground to be set at the same voltage level as that of the cathode of the photodiode, and an output terminal which is connected to the second terminal of the feedback capacitive element 221, and (iii) a switch 223 which has a first terminal connected to the inverting input terminal of the operational amplifier 222 and a second terminal connected to the output terminal of the operational amplifier 222, and is opened/closed in response to a reset signal RST.

The step charge generator 230 comprises (i) a switch 231 which receives the reference voltage level +Vref at its first terminal and is opened/closed in response to the signal D1, (ii) a switch 232 which receives the reference voltage level −Vref at its first terminal and is opened/closed in response to the inverted signal D1*, (iii) a switch 233 which has a first terminal connected to ground, and is opened/closed in response to the clock signal CLK1, (iv) a switch 234 which has a first terminal connected to ground, and is opened/closed in response to the clock signal CLK1, (v) a step charge generation capacitive element 235 (capacitance=C12) which has a first terminal connected to the second terminal of the switch 233, and a second terminal connected to the second terminal of the switch 234, (vi) a switch 236 which has a first terminal connected to the first terminal of the step charge generation capacitive element 235, and a second terminal connected to the input terminal of the operational amplifier 222, and is opened/closed in response to the clock signal CLK2, and (vii) a switch 237 which has a first terminal connected to the second terminals of the switches 231 and 232, and a second terminal connected to the second terminal of the step charge generation capacitive element, and is opened/closed in response to the clock signal CLK2.

The binary sampling circuit 400 comprises a D-type flip-flop, which receives the comparison result signal CMP at its data input terminal, receives the clock signal CLK1 at its trigger terminal, samples the comparison result signal CMP in response to the leading edge of the clock signal CLK1, and outputs the sampled signal from its data output terminal, which can be reset by the reset signal RST.

The step charge generation control circuit 460 comprises an inverter for receiving and inverting the signal D1, and outputting the inverted signal.

Figure 2:
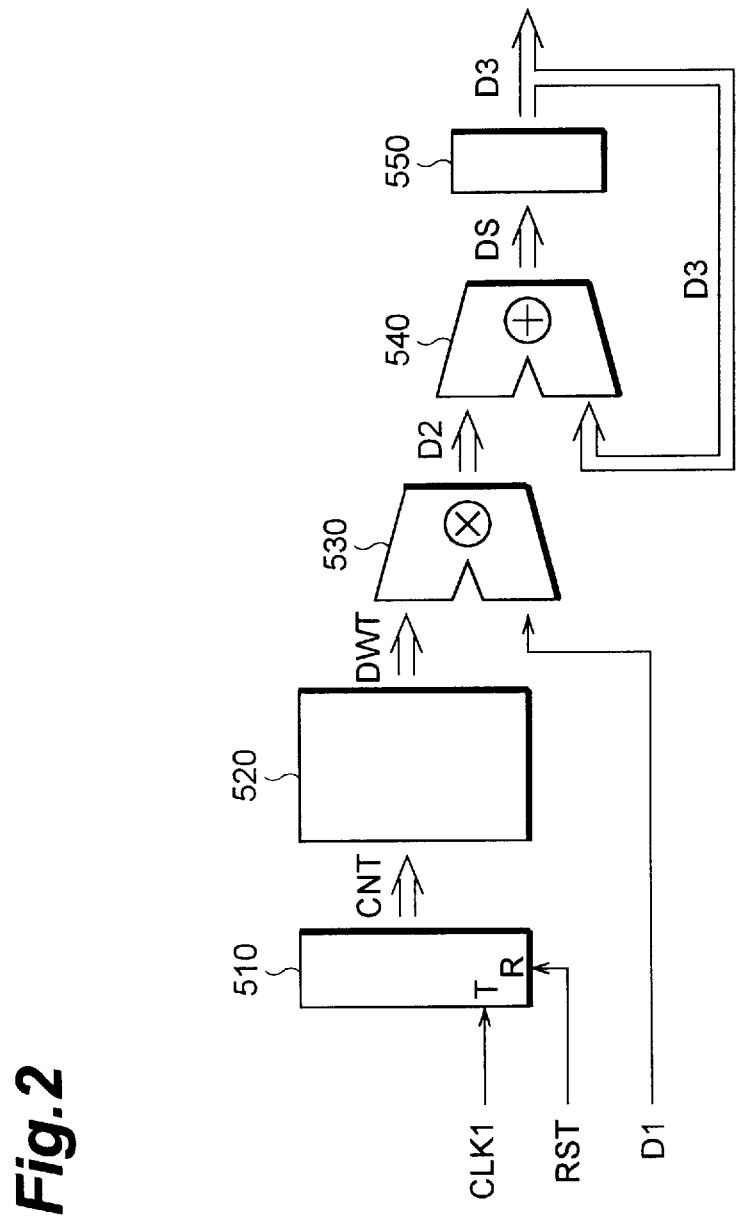
FIG. 2 is a circuit diagram showing the arrangement of a digital filter circuit.

FIG. 2 is a circuit diagram showing the arrangement of the digital filter circuit 500. As shown in FIG. 2, the digital filter circuit 500 comprises (i) a counter 510 which receives the clock signal CLK1 at its trigger terminal, counts the clock signal CLK1, outputs the count value, and can be reset by the reset signal RST, (ii) a data table 520 which receives a count value signal CNT output from the counter 510 and outputs weighted data DWT obtained by weighting the count value, (iii) a multiplier 530 which receives the weighted data DWT and the signal D1, calculates the product of the count value and the signal D1, and outputs a product signal D2, (iv) an adder 540 which receives the product signal D2 at its first data input terminal, calculates the sum of the signal D2 and a data signal D3 received at its second input terminal, and outputs a sum signal DS, and (v) a holding circuit 550 which latches the sum signal DS and outputs the data signal D3.

Figure 3:
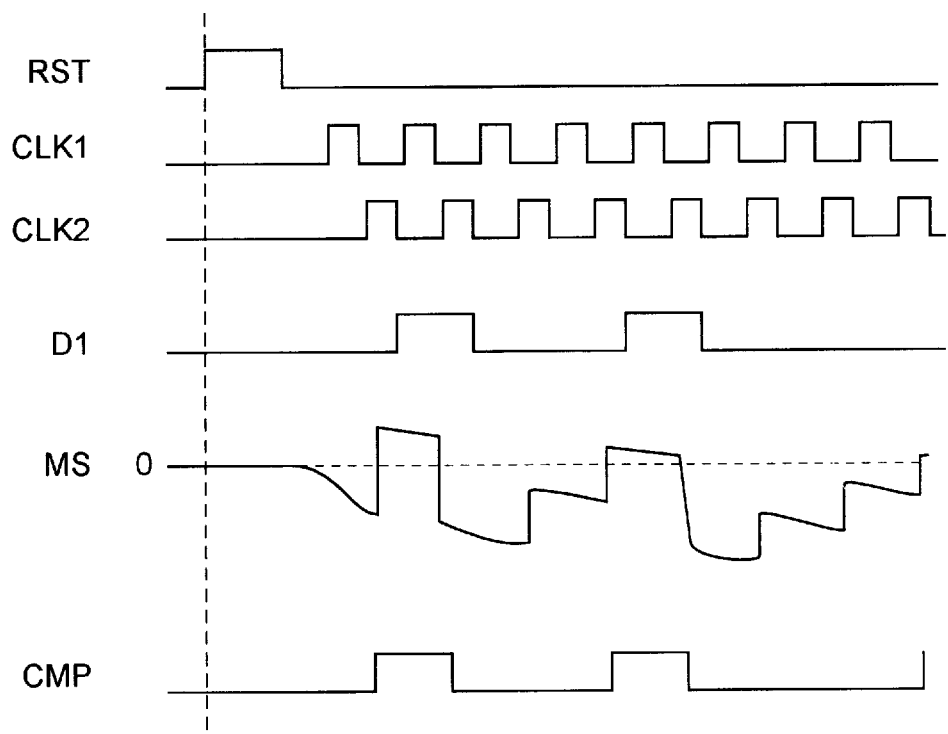
FIG. 3 is a timing chart showing the operation of the solid-state image sensing device according to the first embodiment of the present invention.

The solid-state image sensing device of this embodiment obtains digital data corresponding to the intensity of light by the photodiode 100 as follows. FIG. 3 is a timing chart showing the operation of the solid-state image sensing device of this embodiment.

Prior to measuring the received light amount, the fundamental timing generation circuit 610 sets the reset signal RST at logical truth level to close the switch 223 so as to clear the charge accumulated in the feedback capacitive element 221, and to reset the count value output from the counter 510 to zero.

Also, the circuit 610 resets the binary sampling circuit 400. As a consequence, the switch 232 is closed.

The circuit 610 then sets the reset signal RST at logical false level, and thereafter, the intensity of light by the photodiode is measured in synchronism with the clock signals CLK1 and CLK2.

In the solid-state image sensing device of this embodiment, when the photodiode 100 receives light, a charge corresponding to the received light amount is produced, and is output as a current signal. This current signal is received by the integral circuit 220 constituted by the feedback capacitive element 221 and the operational amplifier 222, and is accumulated and integrated.

Since the signal output terminal of the photodiode 100, the first terminal of the feedback capacitive element 221, and the signal input terminal of the operational amplifier 222 are directly electrically connected to each other, and since the current integral effect itself is not originally influenced by the offset voltage, the voltage value output as a result of the integral operation is free from any influence of the offset voltage.

On the other hand, in the step charge generator 230, when the clock signal CLK1 supplied from the fundamental timing generation circuit 610 changes to logical truth level, the switches 233 and 234 are closed, and the voltage level across the two terminals of the step charge generation capacitive element 235 is set at the ground voltage level. As a consequence, the charge to be accumulated in the step charge generation capacitive element 235 becomes zero. After the clock signal CLK1 changes to logical false level and the switches 233 and 234 are opened, when the clock signal CLK2 has changed to logical truth level, the switches 236 and 237 are closed. As a consequence, a step charge Q21 corresponding to the reference voltage level −Vref is produced in the step charge generation capacitive element 235, and is transferred to the feedback capacitive element 221. Note that the charge Q21 is given by:

$$Q21 = C12 \cdot (-Vref) \quad (1)$$

The charge Q21 and a charge Q11 input from the photodiode 100 before the clock signal CLK1 changes to the second logical truth level are accumulated in the feedback capacitive element 221, and a voltage level V11, which is given by the equation below in accordance with a charge Q01 as the sum of the charges Q21 and Q11, is output when the clock signal CLK1 has changed to the second logical truth level:

$$V11 = Q01/C11$$

The voltage level V11 is received by the comparator 300, and is compared with zero voltage level. If V11>0, the comparator 300 outputs "1" as the comparison result signal CMP to the binary sampling circuit 400. On the other hand, if V11≦0, the comparator 300 outputs "0" as the comparison result signal CMP to the binary sampling circuit 400.

The binary sampling circuit 400 samples the comparison result signal CMP in response to the leading edge of the clock signal CLK1, and outputs a digital signal D1.

The signal D1 is received by the step charge generation control circuit 460. The step charge generation control circuit 460 outputs the signal D1 without changing its value, and also outputs an inverted signal D1*. That is, the circuit 460 outputs a pair of signals, one of which has logical truth level. The pair of signals serve as an instruction for closing one of the switches 231 and 232. More specifically, when the comparison result signal CMP is "0", the inverted signal D1* has logical truth level, and the reference voltage level −Vref serves as the reference voltage level upon generating a step charge; when the comparison result signal CMP is "1", the signal D1 has logical truth level, and the reference voltage level +Vref serves as the reference voltage level upon generating a step charge.

The description will continue assuming that V11>0 holds when the clock signal CLK1 has changed to logical truth level the second time.

The signal D1 (="1") is received by the digital filter circuit 500. The counter 510 counts the clock signal CLK1, and the data table 520 outputs weighted data DWT for the signal D1 at that time. The multiplier 530 calculates the product of the weighted data DWT and 1 as the value of the signal D1, and outputs a product value signal D2 with the value of the weighted data DWT as the product value. The product value signal D2 is received by the adder 540, which calculates the sum of the input product value and the previous sum held in the holding circuit 550 and outputs the sum as a sum signal DS. The holding circuit 550 holds the calculation result, and outputs it as a signal D3.

When the clock signal CLK1 has changed to logical truth level the second time, the switches 233 and 234 are closed, and the voltage level across the two terminals of the step charge generation capacitive element 235 is set at the ground voltage level. As a consequence, the charge to be accumulated in the step charge generation capacitive element 235 becomes zero. After the clock signal CLK1 changes to logical false level and the switches 233 and 234 are opened, when the clock signal CLK2 has changed to logical truth level, the switches 236 and 237 are closed. Consequently, a step charge Q22 corresponding to the reference voltage level +Vref is produced in the step charge generation capacitive element 235, and is transferred to the feedback capacitive element 221. Note that the charge Q22 is given by:

$$Q22=C12\cdot(+Vref) \tag{2}$$

In addition to the charge Q01, the charge Q22 and a charge Q12 input from the photodiode 100 before the clock signal CLK1 changes to logical truth level the third time after assuming logical truth level the second time are accumulated in the feedback capacitive element 221, and a voltage level V12 given by the equation below in accordance with a charge Q02 as the sum total of these charges is output when the clock signal CLK1 has changed to logical truth level the third time:

$$V12=Q02/C11$$

The signal D1 is received by the step charge generation control circuit 460. The step charge generation control circuit 460 outputs the signal D1 without changing its value, and also outputs an inverted signal D1*.

The description will continue postulating that V11≦0 holds when the clock signal CLK1 has changed to logical truth level the third time.

The signal D1 (="0") is received by the digital filter circuit 500. The counter 510 counts the clock signal CLK1, and the data table 520 outputs weighted data DWT for the signal D1 at that time. The multiplier 530 calculates the product of the weighted data DWT and 0 as the value of the signal D1, and outputs a product value signal D2 with a value "0" as the product value. The product value signal D2 is received by the adder 540, which calculates the sum of the input product value and the previous sum held in the holding circuit 550 and outputs the sum as a sum signal DS. The holding circuit 550 holds the calculation result, and outputs it as a signal D3.

Thereafter, for a period corresponding to the required resolution of the AD conversion result, a serial digital signal which is obtained by ΣΔ-modulating the current signal input from the photodiode 100 by the ΣΔ modulator 210, binarizing the modulation result by the comparator 300, and sampling the binary signal by the binary sampling circuit is digitally filtered and processed by the digital filter circuit 500, thereby obtaining an AD conversion result. In this manner, an AD conversion result free from any influence of the offset voltage can be obtained.

Note that the period corresponding to the required resolution of the AD conversion result is a time duration $2^N$ times the cycle of the clock signal CLK1 if an N-bit resolution is required.

The capacitances C11 and C12 are selected in accordance with the current range of the photodiode 100 in terms of the conversion precision and speed. Note that pairs of different types of first feedback capacitive elements and first step charge generation capacitive elements, each pair of which has a predetermined ratio between the capacitances C11 and C12, are preferably prepared to allow selection of a desired one of these pairs.

The above embodiment uses only one photodiode. Alternatively, a plurality of photodiodes, which are arranged in a one- or two-dimensional array, may be used. In this case, a photodiode selection circuit is added to select the photodiodes in a predetermined order or random order, and thereafter, the above-mentioned operations can be executed. Also, a plurality of pairs of above-mentioned photodiodes and AD conversion units may be arranged in parallel with each other.

When an array of a plurality of solid-state image sensing devices of this embodiment is integrated on a single chip, an output selection circuit is preferably added to sequentially select and read out the outputs from the digital filter circuits in terms of the number of pins of the chip, and the like.

(Second Embodiment)

Figure 4:
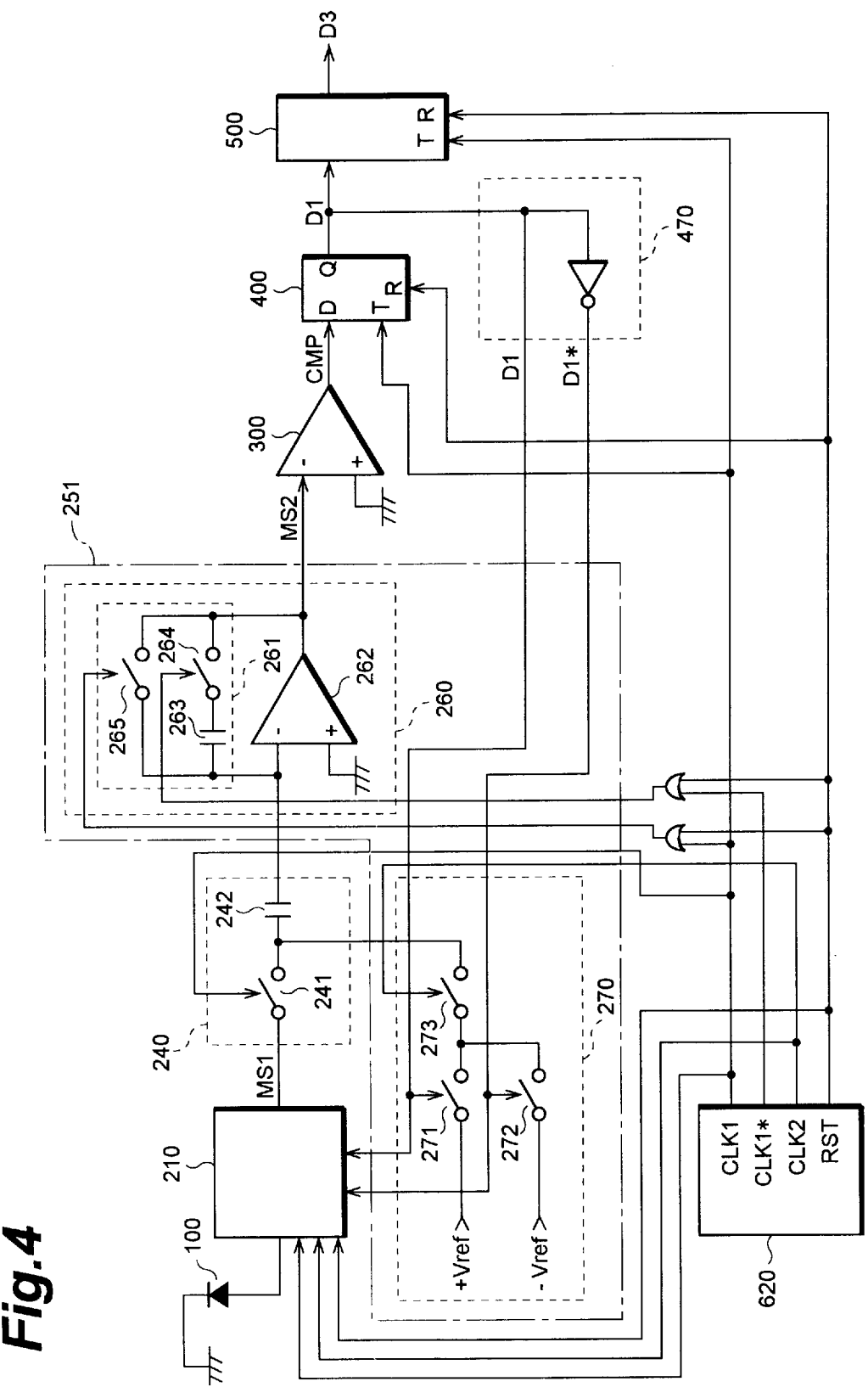
FIG. 4 is a circuit diagram showing the arrangement of a solid-state image sensing device according to the second embodiment of the present invention.

FIG. 4 is a circuit diagram showing the arrangement of a solid-state image sensing device according to the second embodiment of the present invention. In this embodiment, AD conversion is executed by performing ΣΔ modulation using two ΣΔ modulators. As shown in FIG. 4, the solid-state image sensing device of this embodiment comprises (a) a photodiode 100, the cathode of which is connected to ground, and which produces a charge in correspondence with the received light amount and outputs the charge from the anode, (b) a ΣΔ modulator 210 which receives the current signal output from the photodiode 100, and integrates and ΣΔ-modulates the input charge, (c) a signal sampling circuit 240 which receives and samples a modulated signal MS1 output from the ΣΔ modulator 210, (d) a ΣΔ modulator 251 which integrates and ΣΔ-modulates the sampled signal output from the signal sampling circuit 240, (e) a comparator 300 which compares the voltage level of a modulated signal MS2 output from the ΣΔ modulator 251 with the ground voltage level, and outputs a binary comparison result signal CMP corresponding to the comparison result, (f) a binary sampling circuit 400 which receives the comparison result signal CMP, samples the signal CMP in synchronism with a clock signal CLK1, and outputs a binary digital signal D1, (g) a step charge generation control circuit 470 which receives the signal D1, and outputs the signal D1 and an inverted signal D1* of the signal D1 to the ΣΔ modulators 210 and 251, (h) a digital filter circuit 500 which receives the digital signal D1 and digitally filters the signal D1 to obtain an AD conversion result, and (i) a fundamental timing generation circuit 620 which generates a clock signal CLK1 and a clock signal CLK2, which is at logical false level while the clock signal CLK1 is at logical truth level, and changes to logical truth level during a period included in the logical false level period of the clock signal CLK1, outputs the clock signals CLK1 and CLK2 to the ΣΔ modulator 210, the signal sampling circuit 240, and the ΣΔ modulator 251, and outputs the clock signal CLK1 and a reset signal to the binary sampling circuit 400.

The arrangement of the solid-state image sensing device of this embodiment is substantially the same as that of the first embodiment, except that the device further comprises the signal sampling circuit 240 and the ΣΔ modulator 251 at positions between the ΣΔ modulator 210 and the comparator 300.

The signal sampling circuit 240 comprises (i) a switch 241 which has a first terminal connected to the output terminal of the ΣΔ modulator 210, and is opened/closed in response to the clock signal CLK1, and (ii) a signal transmission capacitive element 242 (capacitance=C21) which has a first terminal connected to the second terminal of the switch 241, and a second terminal connected to the first input terminal of the ΣΔ modulator 251.

The ΣΔ modulator 251 comprises (i) an integral circuit 260 which accumulates and integrates a charge from the signal sampling circuit 240, and (ii) a step charge generator 270 which generates a step charge on the basis of reference voltage levels +Vref and −Vref in synchronism with the clock signal CLK2, and supplies the charge to the integral circuit 260.

The integral circuit 260 comprises (i) a feedback capacitance circuit 261 having a first terminal connected to the signal output terminal of the signal sampling circuit 240, and (ii) an operational amplifier 262 which has an inverting input terminal serving as a signal input terminal connected to the signal output terminal of the signal sampling circuit 240, a non-inverting input terminal connected to ground, and an output terminal connected to the second terminal of the feedback capacitance circuit 261.

The feedback capacitance circuit 261 comprises (i) a feedback capacitive element 263 (capacitance=C22) having a first terminal connected to the signal input terminal of the operational amplifier 262, (ii) a switch 264 which has a first terminal connected to the second terminal of the feedback capacitive element 263 and a second terminal connected to the output terminal of the operational amplifier 262, and is opened/closed in response to an inverted signal CLK1* of the clock signal CLK1 or a reset signal RST, and (iii) a switch 265 which has a first terminal connected to the signal input terminal of the operational amplifier 262 and a second terminal connected to the output terminal of the operational amplifier 262, and is opened/closed in response to the clock signal CLK1 or the reset signal.

The step charge generator 270 comprises (i) a switch 271 which receives the reference voltage level +Vref at its first terminal, and is opened/closed in response to the output signal D1 from the binary sampling circuit 400, (ii) a switch 272 which receives the reference voltage level −Vref at its first terminal, and is opened/closed in response to the inverted signal D1* of the output signal from the binary sampling circuit 400, and (iii) a switch 273 which has a first terminal connected to the second terminals of the switches 271 and 272 and a second terminal connected to the first terminal of the signal transmission capacitive element 242, and is opened/closed in response to the clock signal CLK2.

The solid-state image sensing device of this embodiment obtains digital data corresponding to the intensity of light by the photodiode 100 as follows.

Figure 5:
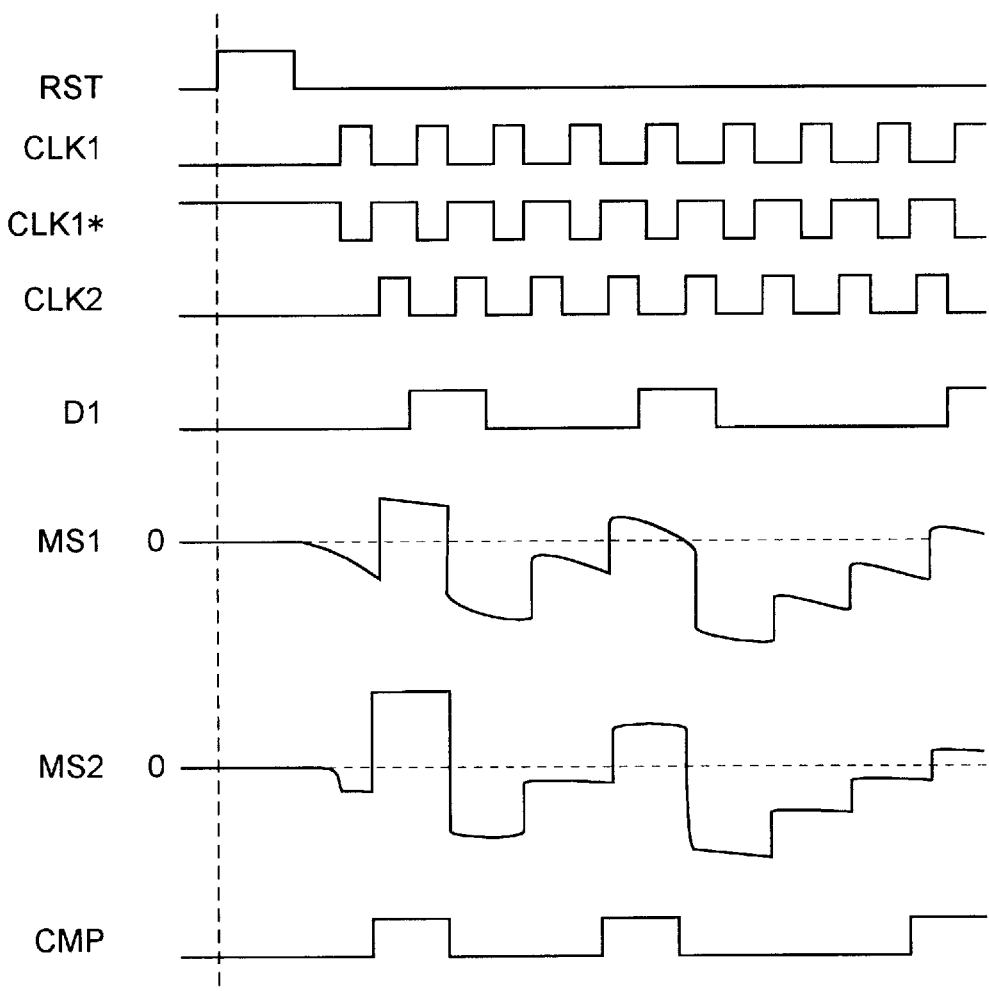
FIG. 5 is a timing chart showing the operation of the solid-state image sensing device according to the second embodiment of the present invention.

FIG. 5 is a timing chart showing the operation of the solid-state image sensing device of this embodiment.

Prior to measuring the received light amount, the fundamental timing generation circuit 620 sets the reset signal RST at logical truth level to close a switch 223 and the switches 264 and 265 so as to clear the charges accumulated in a feedback capacitive element 221 and the feedback capacitive element 263, and to reset the count value output from a counter 510 to zero.

Also, the circuit 620 resets the binary sampling circuit 400. As a consequence, a switch 232 is closed.

Subsequently, the circuit 620 sets the reset signal RST at logical false level, and thereafter, the intensity of light by the photodiode is measured in synchronism with the clock signals CLK1 and CLK2.

In the solid-state image sensing device of this embodiment, when the photodiode 100 receives light, a charge corresponding to the received light amount is produced, and is output as a current signal. This current signal is ΣΔ-modulated by the ΣΔ modulator 210 to output a modulated signal MS1, as has been described in the first embodiment.

Normally, in ΣΔ modulation using a single ΣΔ modulator, changes in output reference voltage level occur owing to current emission of the photodiode.

The modulated signal MS1 is received by the signal sampling circuit 240. The switch 241 of the signal sampling circuit 240 is closed when the clock signal CLK1 has changed to logic truth level, and accumulates a charge Q31 corresponding to the voltage level value of the modulated signal MS1 in the signal transmission capacitive element 242. During the logical truth level period of the clock signal CLK1, the switch 265 is closed, and the input and output terminals of the operational amplifier 262 are short-circuited. However, since the switch 264 is open, the charge accumulated in the feedback capacitive element 263 remains preserved.

When the clock signal CLK1 has changed to logical false level, the inverted signal CLK1* changes to logical truth level, the switches 241 and 265 are opened, and the switch 264 is closed.

Thereafter, when the clock signal CLK2 has changed to logical truth level, the switch 273 is closed, and a step charge Q32 is produced. When the signal D1 is "0", since the switch 272 is closed and −Vref is selected, the step charge Q32 is given by:

$$Q32 = C21 \cdot (-Vref) \qquad (3)$$

On the other hand, when the signal D1 is "1", since the switch 271 is closed and +Vref is selected, the charge Q32 is:

$$Q32 = C21 \cdot (+Vref) \qquad (4)$$

In this manner, a charge Q03 as the sum of the charges Q31 and Q32 is supplied to the feedback capacitive element 263. A voltage level V21, which is given by the equation below in accordance with a charge Q04 as the sum of the charge Q03 and a charge accumulated so far in the feedback capacitive element 263, is output as a modulated signal MS2:

$$V21 = Q04/C22$$

During the sampling period of the modulated signal MS1 by the signal sampling circuit 240, i.e., during the logical truth level period of the clock signal CLK1, the switch 265 is closed, the input and output terminals of the operational amplifier 262 are short-circuited, and an offset voltage is generated. However, during this period, since the switch 264 is open, the charge accumulated in the feedback capacitive element 263 remains preserved. Also, since the second terminal of the signal transmission capacitive element 242 is kept connected to the input terminal of the operational amplifier 262, it is kept applied with the offset voltage. Therefore, after the switch 265 is opened, even when the switch 264 is closed in response to the inverted signal CLK1* and transits to the state for accumulating a charge in the feedback capacitive element 263, no influence of the offset voltage appears. In this manner, offset-free ΣΔ modulation can be executed.

The modulated signal MS2 output from the ΣΔ modulator 251 is received by the comparator 300, and thereafter, an AD conversion result is obtained without any influence of the offset voltage, as in the first embodiment.

Capacitances C11 and C12 are selected in accordance with the current range of the photodiode 100 in terms of the conversion precision and speed, as in the first embodiment. Note that pairs of different types of first feedback capacitive elements and first step charge generation capacitive elements, each pair of which has a predetermined ratio between the capacitances C11 and C12, are preferably prepared to allow selection of a desired one of these pairs.

The above embodiment uses only one photodiode. Alternatively, as in the first embodiment, a plurality of photodiodes, which are arranged in a one- or two-dimensional array, may be used. In this case, a photodiode selection circuit is added to select the photodiodes in a predetermined order or random order, and thereafter, the above-mentioned operations can be executed. Also, a plurality of pairs of above-mentioned photodiodes and AD conversion units may be arranged in parallel with each other.

When an array of a plurality of solid-state image sensing devices of this embodiment is integrated on a single chip, an output selection circuit is preferably added to sequentially select and read out the outputs from the digital filter circuits in terms of the number of pins of the chip, and the like, as in the first embodiment.

(Third Embodiment)

Figure 6:
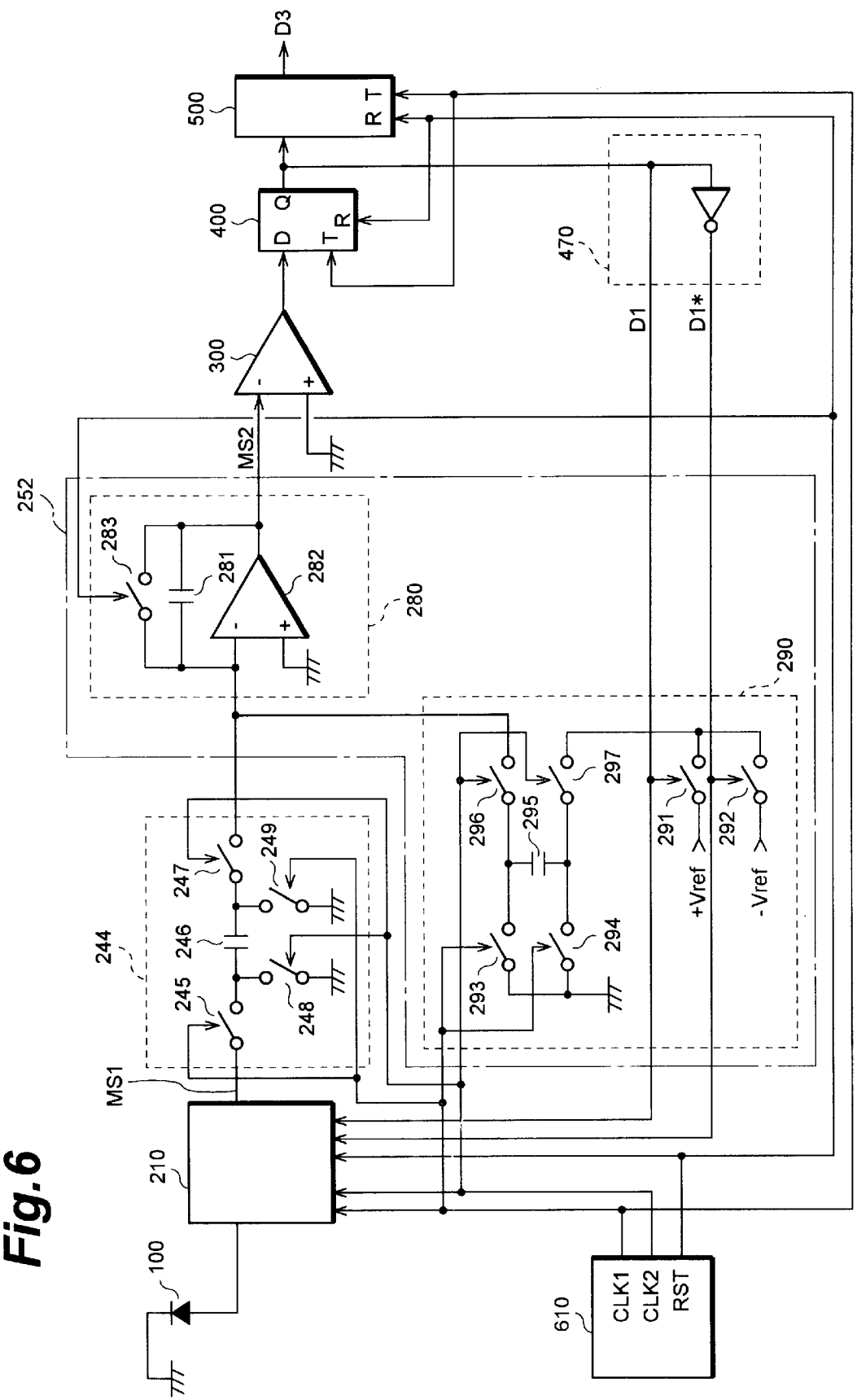
FIG. 6 is a circuit diagram showing the arrangement of a solid-state image sensing device according to the third embodiment of the present invention.

FIG. 6 is a circuit diagram showing the arrangement of a solid-state image sensing device according to the third embodiment of the present invention. In this embodiment, AD conversion is executed by performing ΣΔ modulation using two ΣΔ modulators, as in the second embodiment. As shown in FIG. 6, the arrangement of the solid-state image sensing device of this embodiment is substantially the same as that in the second embodiment, except that a signal sampling circuit 244 and a ΣΔ modulator 252 are used.

The signal sampling circuit 244 comprises (i) a switch 245 which has a first terminal connected to the output terminal of a ΣΔ modulator 210, and is opened/closed in response to a clock signal CLK1, (ii) a signal transmission capacitive element 246 having a first terminal connected to the second terminal of the switch 245, (iii) a switch 247 which has a first terminal connected to the second terminal of the signal transmission capacitive element 246 and a second terminal connected to the signal input terminal of the ΣΔ modulator 252, and is opened/closed in response to a clock signal CLK2, (iv) a switch 248 which has a first terminal connected to ground and a second terminal connected to the first terminal of the signal transmission capacitive element 246, and is opened/closed in response to the clock signal CLK2, and (v) a switch 249 which has a first terminal connected to ground and a second terminal connected to the second terminal of the signal transmission capacitive element, and is opened/closed in response to the clock signal CLK1.

The ΣΔ modulator 252 comprises (i) an integral circuit 280 which accumulates and integrates the charge from the signal sampling circuit 244, and (ii) a step charge generator 290 which generates a step charge on the basis of reference voltage levels +Vref and −Vref in synchronism with the clock signals CLK1 and CLK2, and supplies the charge to the integral circuit 280.

The integral circuit 280 comprises (i) a feedback capacitive element 281 (capacitance=C23) having a first terminal connected to the output terminal of the signal sampling circuit 244, (ii) an operational amplifier 282 which has an inverting input terminal serving as a signal input terminal connected to the output terminal of the signal sampling circuit 244, a non-inverting input terminal connected to ground, and an output terminal connected to the second terminal of the feedback capacitive element 281, and (iii) a switch 283 which has a first terminal connected to the input terminal of the operational amplifier 282 and a second terminal connected to the output terminal of the operational amplifier 282, and is opened/closed in response to a reset signal RST.

The step charge generator 290 comprises (i) a switch 291 which receives the reference voltage level +Vref at its first terminal and is opened/closed in response to a signal D1, (ii) a switch 292 which receives the reference voltage level −Vref at its first terminal and is opened/closed in response to an inverted signal D1*, (iii) a switch 293 which has a first terminal connected to ground and is opened/closed in response to the clock signal CLK1, (iv) a switch 294 which has a first terminal connected to ground and is opened/closed in response to the clock signal CLK1, (v) a step charge generation capacitive element 295 (capacitance=C24) which has a first terminal connected to the second terminal of the switch 293 and a second terminal connected to the second terminal of the switch 294, (vi) a switch 296 which has a first terminal connected to the first terminal of the step charge generation capacitive element 295 and a second terminal connected to the inverting input terminal of the operational amplifier 282, and is opened/closed in response to the clock signal CLK2, and (vii) a switch 297 which has a first terminal connected to the second terminals of the switches 291 and 292, and a second terminal connected to the second terminal of the step charge generation capacitive element 295, and is opened/closed in response to the clock signal CLK2.

More specifically, the ΣΔ modulators 210 and 252 are those having the same circuit arrangement, and are connected in series with each other via the signal sampling circuit to attain quadratic ΣΔ modulation.

Figure 7:
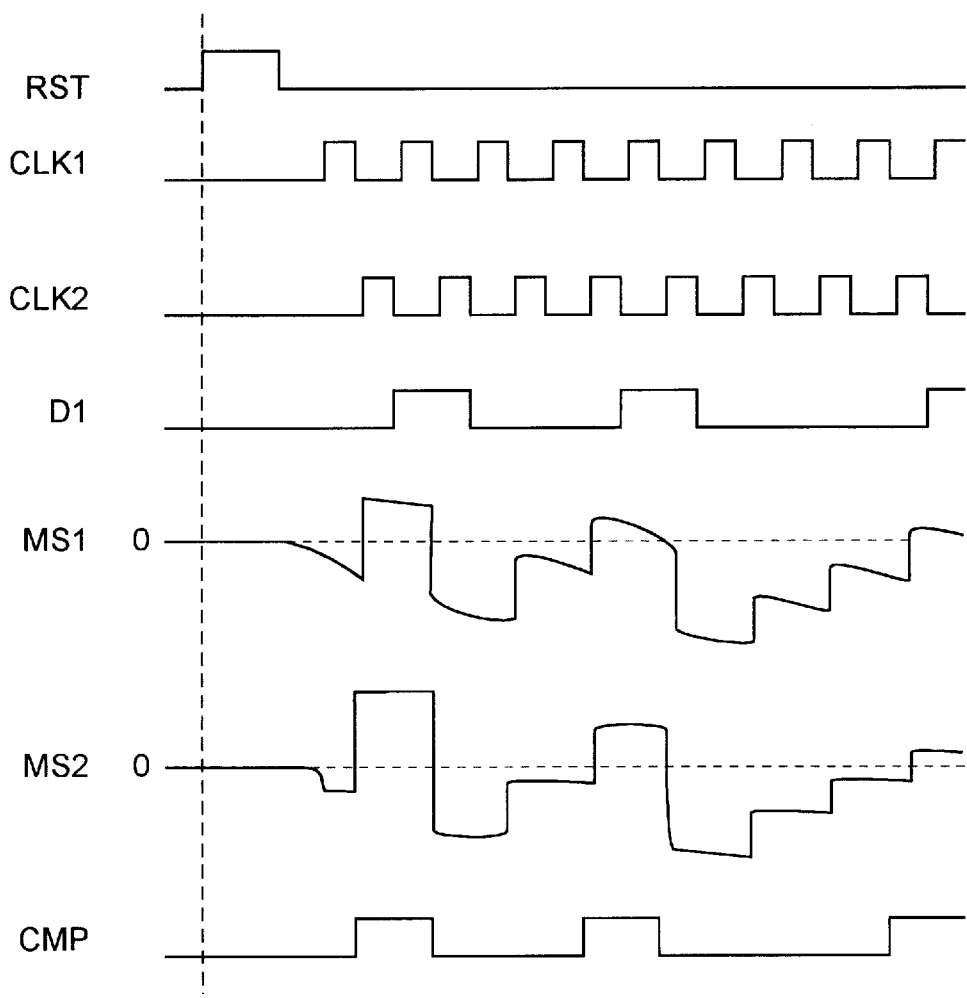
FIG. 7 is a timing chart showing the operation of the solid-state image sensing device according to the third embodiment of the present invention.

The solid-state image sensing device of this embodiment obtains digital data corresponding to the intensity of light by a photodiode 100 as follows. FIG. 7 is a timing chart showing the operation of the solid-state image sensing device of this embodiment.

Prior to measuring the received light amount, a fundamental timing generation circuit 610 sets the reset signal RST at logical truth level to close a switch 223 and the switch 283 so as to remove the charges accumulated in a feedback capacitive element 221 and the feedback capacitive element 281, and to reset the count value output from a counter 510 to zero.

Also, the circuit 610 resets the binary sampling circuit 400. As a consequence, a switch 232 is closed.

The circuit 610 then sets the reset signal RST at logical false level, and thereafter, the intensity of light by the photodiode is measured in synchronism with the clock signals CLK1 and CLK2.

In the solid-state image sensing device of this embodiment, when the photodiode 100 receives light, a charge corresponding to the received light amount is produced, and is output as a current signal. This current signal is ΣΔ-modulated by the ΣΔ modulator 210 to output a modulated signal MS1, as has been described in the first embodiment.

The modulated signal MS1 is input to the signal sampling circuit 244. The switches 245 and 249 in the signal sampling circuit 244 are closed when the clock signal CLK1 has changed to logical truth level, and accumulate a charge Q41 corresponding to the voltage level value of the modulated signal MS1 in the signal transmission capacitive element 246.

Also, when the clock signal CLK1 has changed to logical truth level, the switches 293 and 294 are closed, and the charge in the step charge generation capacitive element 295 is reset to 0.

After the clock signal CLK1 changes to logical false level and the switches 245 and 249 are opened, when the clock signal CLK2 has changed to logical truth level, the switches 247 and 248 are closed, and the charge Q41 is transferred to the feedback capacitive element 281. Also, after the clock signal CLK1 changes to logical false level and the switches 293 and 294 are opened, when the clock signal CLK2 has changed to logical truth level, the switches 296 and 297 are closed, and a step charge Q42 are produced in the step charge generation capacitive element 295. When the signal D1 is "0", since the switch 292 is closed and −Vref is selected, the step charge Q42 becomes:

$$Q42 = C24 \cdot (-Vref) \qquad (5)$$

On the other hand, when the signal D1 is "1", since the switch 291 is closed and +Vref is selected, the step charge Q42 is:

$$Q42 = C24 \cdot (+Vref) \qquad (6)$$

In this manner, a charge Q05 as the sum of the charges Q41 and Q42 is supplied to the feedback capacitive element 281. A voltage level V31, which is given by the equation below in accordance with a charge Q06 as the sum of the charge Q05 and the charge accumulated so far in the feedback capacitive element 281, is output as a modulated signal MS2:

$$V31 = Q06/C23$$

During the sampling period of the modulated signal MS1 by the signal sampling circuit 244, i.e., during the logical truth level period of the clock signal CLK1, when the switches 245 and 249 in the signal sampling circuit 244 are closed in response to the clock signal CLK1 to sample the output signal MS1 from the ΣΔ modulator 210, the second terminal of the signal transmission capacitive element 246 is connected to ground. On the other hand, after the switches 245 and 249 are opened, while the switches 247 and 248 are closed in response to the clock signal CLK2 to transfer a charge to the feedback capacitive element 281, the first terminal of the signal transmission capacitive element 246 is connected ground. Accordingly, no offset voltage difference is produced between the sampling and charge transfer states, and ΣΔ modulation free from any influence of the offset voltage can be executed.

The modulated signal MS2 output from the ΣΔ modulator 252 is received by a comparator 300, and thereafter, an AD conversion result is obtained without any influence of the offset voltage, as in the first embodiment.

Capacitances C11 and C12 are selected in accordance with the current range of the photodiode 100 in terms of the conversion precision and speed, as in the first embodiment. Note that pairs of different types of first feedback capacitive elements and first step charge generation capacitive elements, each pair of which has a predetermined ratio between the capacitances C11 and C12, are preferably prepared to allow selection of a desired one of these pairs.

The above embodiment uses only one photodiode. Alternatively, as in the first embodiment, a plurality of photodiodes, which are arranged in a one- or two-dimensional array, may be used. In this case, a photodiode selection circuit is added to select the photodiodes in a predetermined order or random order, and thereafter, the above-mentioned operations can be executed. Also, a plurality of pairs of above-mentioned photodiodes and AD conversion units may be arranged in parallel with each other.

When an array of a plurality of solid-state image sensing devices of this embodiment is integrated on a single chip, an output selection circuit is preferably added to sequentially select and read out the outputs from the digital filter circuits in terms of the number of pins of the chip, and the like, as in the first embodiment.

(Fourth Embodiment)

Figure 8:
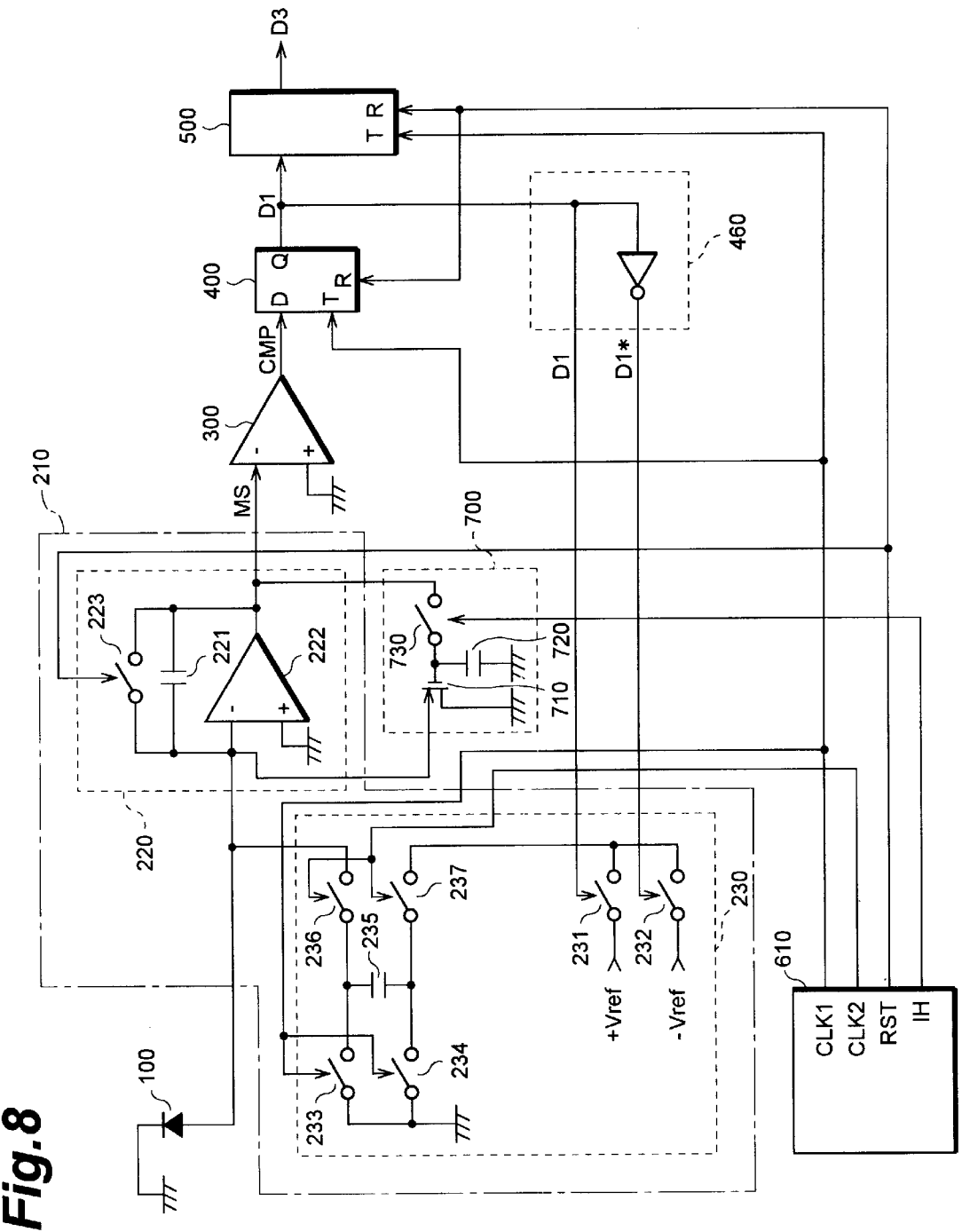
FIG. 8 is a circuit diagram showing the arrangement of a solid-state image sensing device according to the fourth embodiment of the present invention.

FIG. 8 is a circuit diagram showing the arrangement of a solid-state image sensing device according to the fourth embodiment of the present invention. In this embodiment, AD conversion is executed by performing ΣΔ modulation using a single ΣΔ modulator. As shown in FIG. 8, the solid-state image sensing device of this embodiment comprises (a) a photodiode 100, the cathode of which is connected to ground, and which produces a charge in correspondence with the received light amount and outputs the charge from the anode, (b) a dark current removing circuit 700 for removing dark currents of the photodiode 100, (c) a ΣΔ modulator 210 which receives the current signal output from the photodiode 100, and integrates and ΣΔ-modulates the input charge, (d) a comparator 300 which receives a modulated signal MS output form the ΣΔ modulator 210, compares the voltage level of the modulated signal MS with the ground voltage level, and outputs a binary comparison result signal CMP corresponding to the comparison result, (e) a binary sampling circuit 400 which receives the comparison result signal CMP, samples the signal CMP in synchronism with a clock signal CLK1, and outputs a binary digital signal D1, (f) a step charge generation control circuit 460 which receives the signal D1, and outputs the signal D1 and an inverted signal D1* of the signal D1 to the ΣΔ modulator 210, (g) a digital filter circuit 500 which receives the digital signal D1 and digitally filters the signal D1 to obtain an AD conversion result, and (h) a fundamental timing generation circuit 610 which generates a clock signal CLK1 and a clock signal CLK2, which is at logical false level when the clock signal CLK1 is at logical truth level, and changes to logical truth level during a period included in the logical false level period of the clock signal CLK1, outputs the clock signals CLK1 and CLK2 to the ΣΔ modulator 210, and outputs the clock signal CLK1, a reset signal RST, and a current holding instruction signal IH to the binary sampling circuit 400 and the digital filter circuit 500.

That is, the solid-state image sensing device of this embodiment is obtained by adding the dark current removing circuit 700 to the first embodiment.

The dark current removing circuit 700 comprises (i) a field effect transistor (FET) 710 such as a MOS-FET, which has a source terminal connected to the signal input terminal of an operational amplifier 222, and a drain terminal connected to ground, (ii) a dark current storage capacitive element 720 which has a first terminal connected to the gate terminal of the FET 710 and a second terminal connected to ground, and (iii) a current holding switch 730 which has a first terminal connected to the first terminal of the dark current storage capacitive element 720 and a second terminal connected to the output terminal of the operational amplifier 222, and is opened/closed in response to the current holding instruction signal IH.

Figure 9:
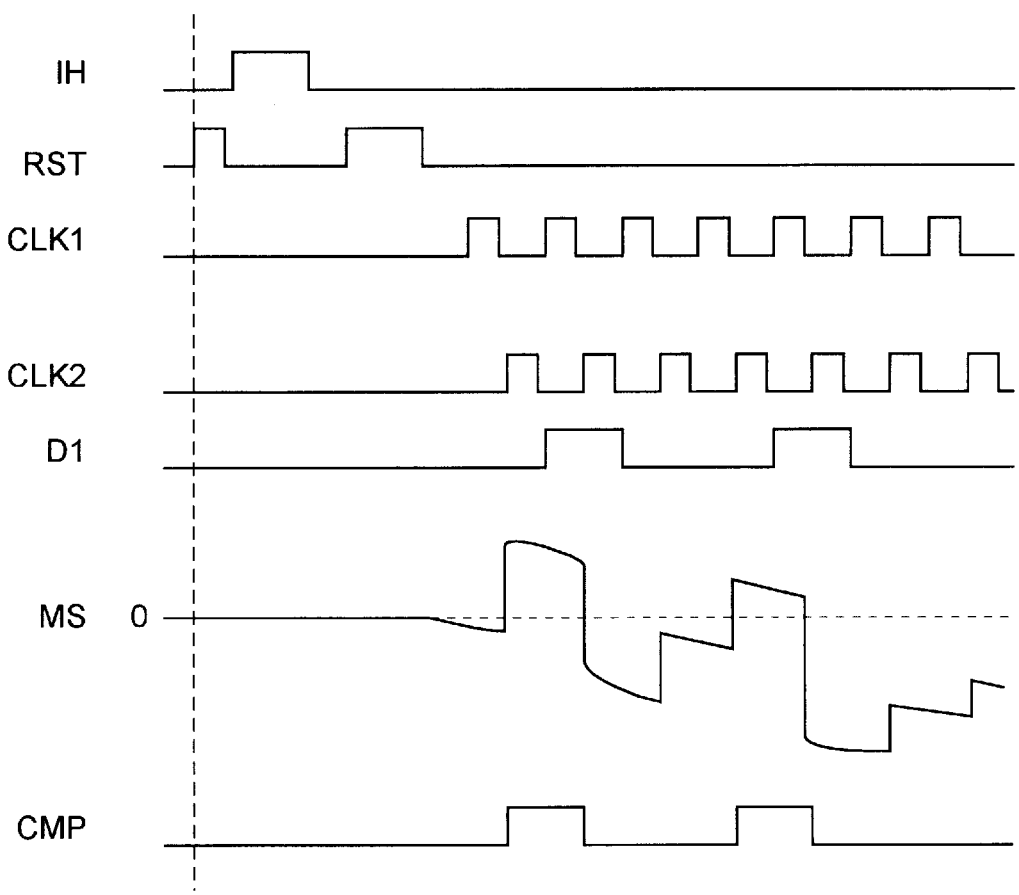
FIG. 9 is a timing chart showing the operation of the solid-state image sensing device according to the fourth embodiment of the present invention.

The solid-state image sensing device of this embodiment obtains digital data corresponding to the intensity of light by the photodiode 100 as follows. FIG. 9 is a timing chart showing the operation of the solid-state image sensing device of this embodiment.

Prior to measuring the received light amount, the photodiode 100 is set in the non-light-receiving state, and the reset signal RST is temporarily set at logical truth level. Thereafter, the current holding instruction signal IH is set at logical truth level to close the current holding switch 730. As a consequence, dark currents produced by the photodiode 100 are input to an integral circuit 220. Upon reception of the dark currents, the integral circuit 220 outputs a voltage signal corresponding to the dark current amount, and this voltage signal is applied to the gate terminal of the FET 710. When this voltage signal is applied to the gate terminal of the FET 710, dark currents flow through the source-drain path of the FET 710.

Subsequently, when the switch 730 is opened, a voltage generated at that time is held by the capacitive element 720, and thereafter, dark currents are removed from the currents to be input to the operational amplifier 222.

The fundamental timing generation circuit 610 sets the reset signal RST at logical truth level to close a switch 223 so as to remove the charge accumulated in a feedback capacitive element 221, and to reset the count value output from a counter 510 to zero.

Also, the circuit 610 resets the binary sampling circuit 400. As a result, a switch 232 is closed.

The circuit 610 then sets the reset signal RST at logical false level, and thereafter, the intensity of light by the photodiode is measured in synchronism with the clock signals CLK1 and CLK2.

Thereafter, the device operates in the same manner as in the first embodiment, and obtains an AD conversion result which is free from any influence of the offset voltage and has higher precision than in the first embodiment.

Capacitances C11 and C12 are selected in accordance with the current range of the photodiode 100 in terms of the conversion precision and speed, as in the first embodiment. Note that pairs of different types of first feedback capacitive elements and first step charge generation capacitive elements, each pair of which has a predetermined ratio between the capacitances C11 and C12, are preferably prepared to allow selection of a desired one of these pairs.

The above embodiment uses only one photodiode. Alternatively, as in the first embodiment, a plurality of photodiodes, which are arranged in a one- or two-dimensional array, may be used. In this case, a photodiode selection circuit is added to select the photodiodes in a predetermined order or random order, and thereafter, the above-mentioned operations can be executed. Also, a plurality of pairs of above-mentioned photodiodes and AD conversion units may be arranged in parallel with each other.

When an array of a plurality of solid-state image sensing devices of this embodiment is integrated on a single chip, an output selection circuit is preferably added to sequentially select and read out the outputs from the digital filter circuits in terms of the number of pins of the chip, and the like, as in the first embodiment.

(Fifth Embodiment)

Figure 10:
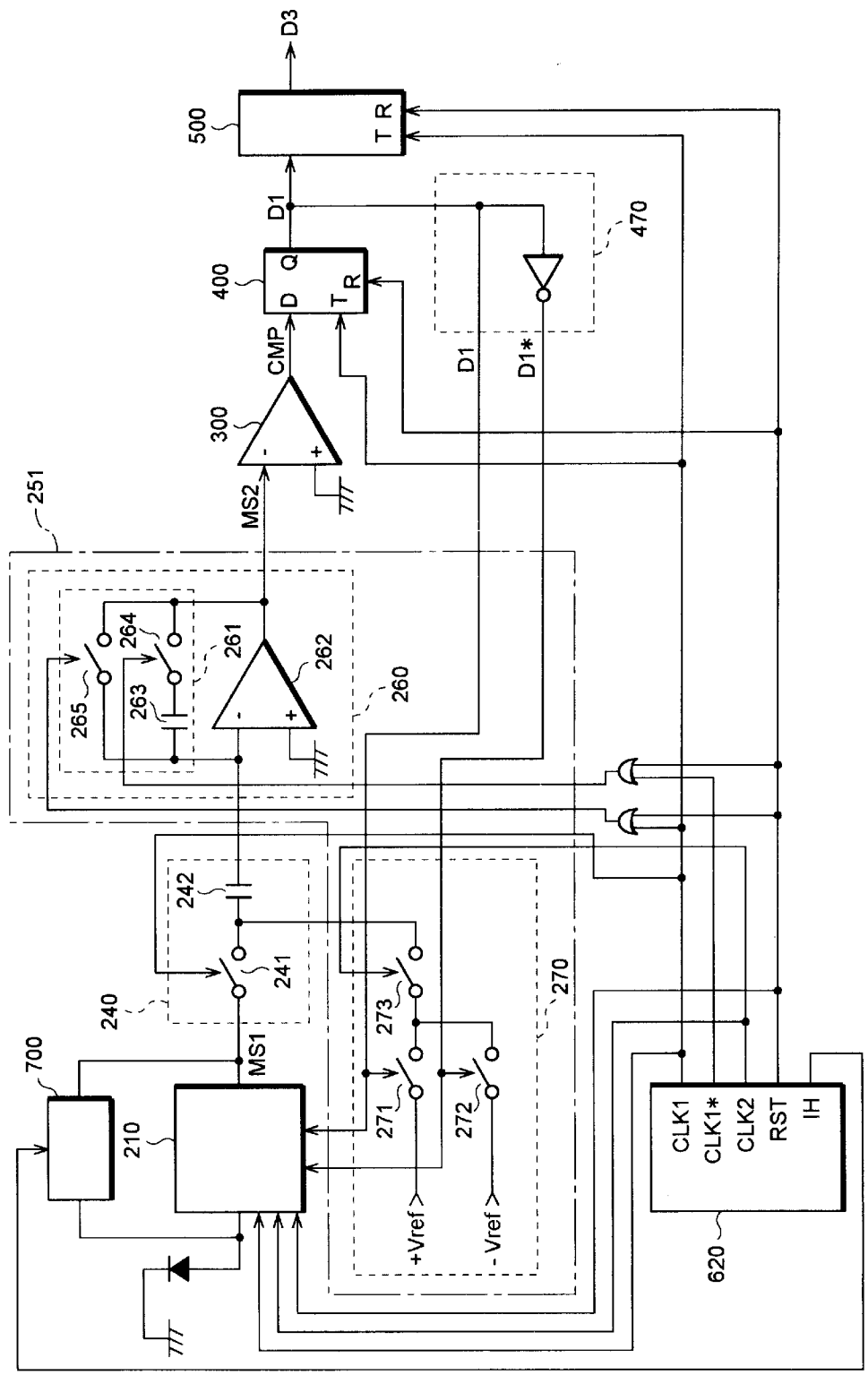
FIG. 10 is a circuit diagram showing the arrangement of a solid-state image sensing device according to the fifth embodiment of the present invention.

FIG. 10 is a circuit diagram showing the arrangement of a solid-state image sensing device according to the fifth embodiment of the present invention. In this embodiment, AD conversion is executed by performing ΣΔ modulation using two ΣΔ modulators. As shown in FIG. 10, the solid-state image sensing device of this embodiment comprises (a) a photodiode 100, the cathode of which is connected to ground, and which produces a charge in correspondence with the received light amount and outputs the charge from the anode, (b) a ΣΔ modulator 210 which receives the current signal output from the photodiode 100, and integrates and ΣΔ-modulates the input charge, (c) a signal sampling circuit 240 which receives and samples a modulated signal MS1 output from the ΣΔ modulator 210, (d) a ΣΔ modulator 251 which integrates and ΣΔ-modulates the sampled signal output from the signal sampling circuit 240, (e) a comparator 300 which compares the voltage level of a modulated signal MS2 output from the ΣΔ modulator 251 with the ground voltage level, and outputs a binary comparison result signal CMP corresponding to the comparison result, (f) a binary sampling circuit 400 which receives the comparison result signal CMP, samples the signal CMP in synchronism with a clock signal CLK1, and outputs a binary digital signal D1, (g) a step charge generation control circuit 470 which receives the signal D1, and outputs the signal D1 and an inverted signal D1* of the signal D1 to the ΣΔ modulators 210 and 251, (h) a digital filter circuit 500 which receives the digital signal D1 and digitally filters the signal D1 to obtain an AD conversion result, and (i) a fundamental timing generation circuit 620 which generates a clock signal CLK1 and a clock signal CLK2, which is at logical false level while the clock signal CLK1 is at logical truth level, and changes to logical truth level during a period included in the logical false level period of the clock signal CLK1, outputs the clock signals CLK1 and CLK2 to the ΣΔ modulator 210, the signal sampling circuit 240, and the ΣΔ modulator 251, and outputs the clock signal CLK1 and a reset signal to the binary sampling circuit 400.

The arrangement of the solid-state image sensing device of this embodiment is substantially the same as that of the fourth embodiment, except that the device further comprises the signal sampling circuit 240 and the ΣΔ modulator 251 at positions between the ΣΔ modulator 210 and the comparator 300. More specifically, the solid-state image sensing device of this embodiment is obtained by adding a dark current removing circuit 700 to the second embodiment.

Figure 11:
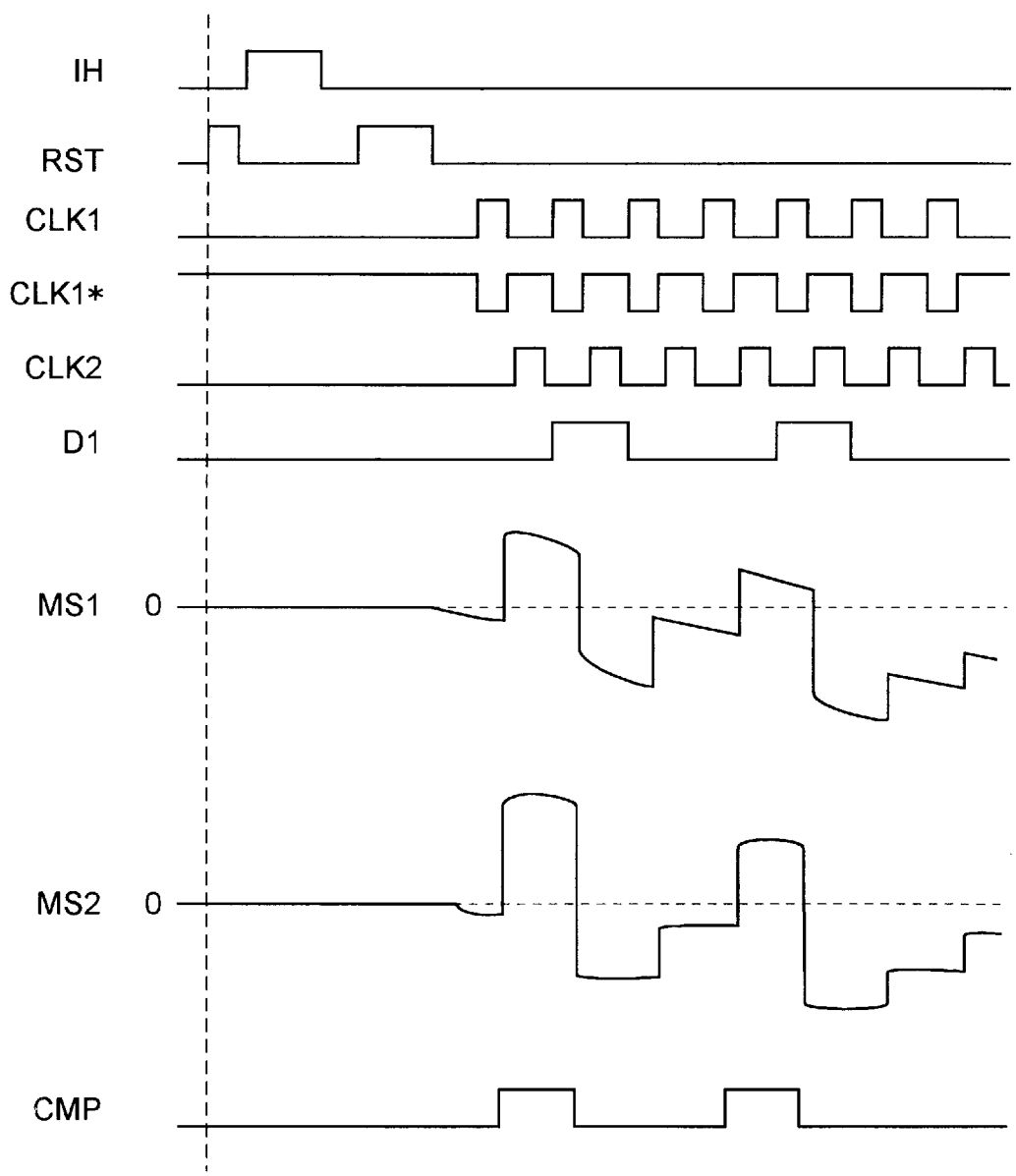
FIG. 11 is a timing chart showing the operation of the solid-state image sensing device according to the fifth embodiment of the present invention.

The solid-state image sensing device of this embodiment obtains digital data corresponding to the intensity of light by the photodiode 100 as follows. FIG. 11 is a timing chart showing the operation of the solid-state image sensing device of this embodiment.

Prior to measuring the received light amount, the dark current removing circuit 700 is set as in the fourth embodiment, and thereafter, the fundamental timing generation circuit 620 sets the reset signal RST at logical truth level to close switches 223, 264, and 265 so as to remove the charges accumulated in feedback capacitive elements 221 and 263, and to reset the count value output from a counter 510 to zero.

Also, the circuit 620 resets the binary sampling circuit 400. As a consequence, a switch 232 is closed.

Subsequently, the circuit 620 sets the reset signal RST at logical false level, and thereafter, the intensity of light by the photodiode is measured in synchronism with the clock signals CLK1 and CLK2.

Thereafter, the device operates in the same manner as in the second embodiment, and obtains an AD conversion result which is free from any influence of the offset voltage and has higher precision than in the second embodiment.

Capacitances C11 and C12 are selected in accordance with the current range of the photodiode 100 in terms of the conversion precision and speed, as in the first embodiment. Note that pairs of different types of first feedback capacitive elements and first step charge generation capacitive elements, each pair of which has a predetermined ratio between the capacitances C11 and C12, are preferably prepared to allow selection of a desired one of these pairs.

The above embodiment uses only one photodiode. Alternatively, as in the first embodiment, a plurality of photodiodes, which are arranged in a one- or two-dimensional array, may be used. In this case, a photodiode selection circuit is added to select the photodiodes in a predetermined order or random order, and thereafter, the above-mentioned operations can be executed. Also, a plurality of pairs of above-mentioned photodiodes and AD conversion units may be arranged in parallel with each other.

When an array of a plurality of solid-state image sensing devices of this embodiment is integrated on a single chip, an output selection circuit is preferably added to sequentially select and read out the outputs from the digital filter circuits in terms of the number of pins of the chip, and the circuit scale of a circuit connected to the output side of this array as in the first embodiment.

(Sixth Embodiment)

Figure 12:
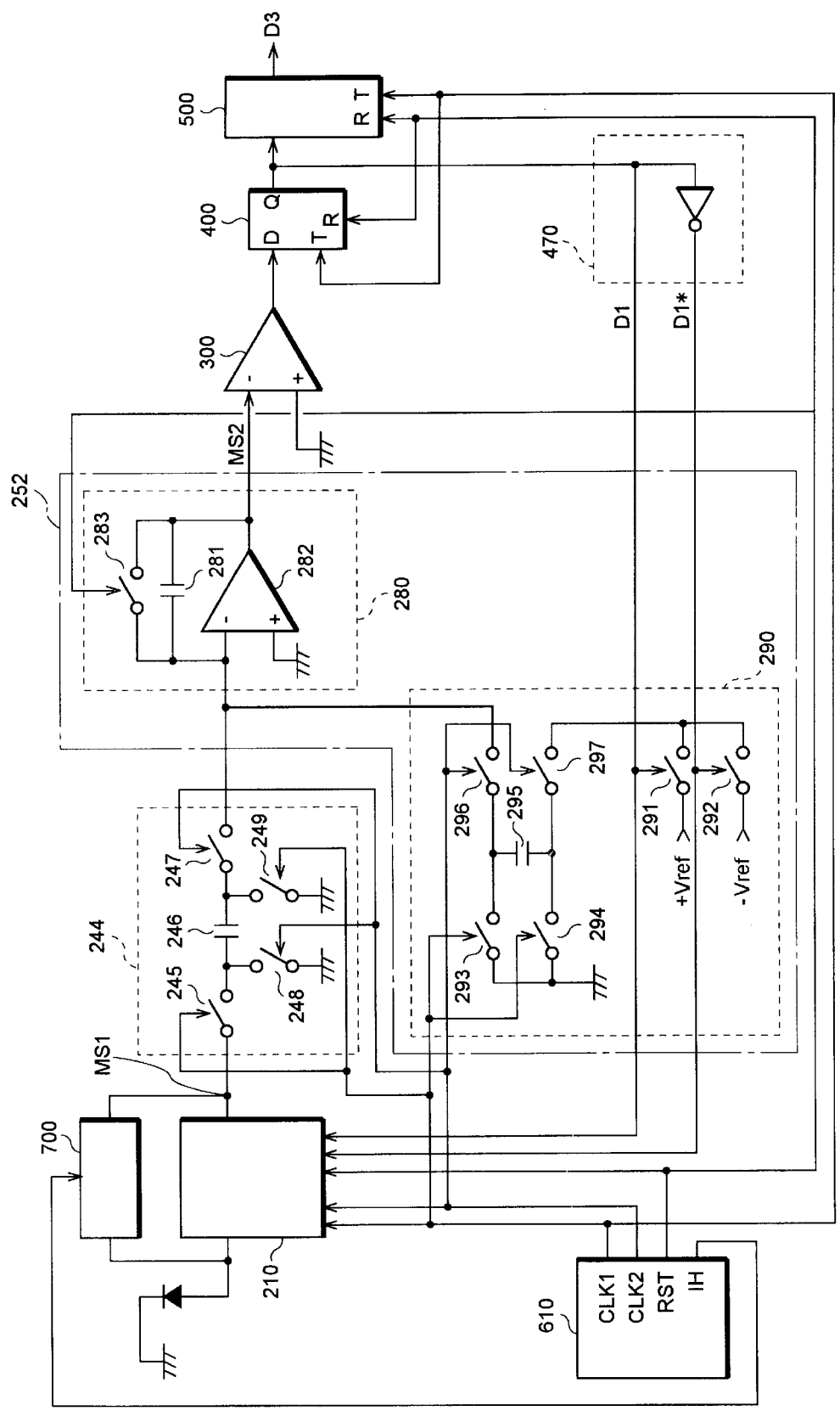
FIG. 12 is a circuit diagram showing the arrangement of a solid-state image sensing device according to the sixth embodiment of the present invention.

FIG. 12 is a circuit diagram showing the arrangement of a solid-state image sensing device according to the sixth embodiment of the present invention. In this embodiment, AD conversion is executed by performing ΣΔ modulation using two ΣΔ modulators, as in the fifth embodiment. As shown in FIG. 12, the arrangement of the solid-state image sensing device of this embodiment is substantially the same as that in the fifth embodiment, except that a signal sampling circuit 244 and a ΣΔ modulator 252 are used. More specifically, the solid-state image sensing device of this embodiment is obtained by adding a dark current removing circuit 700 to the third embodiment.

Figure 13:
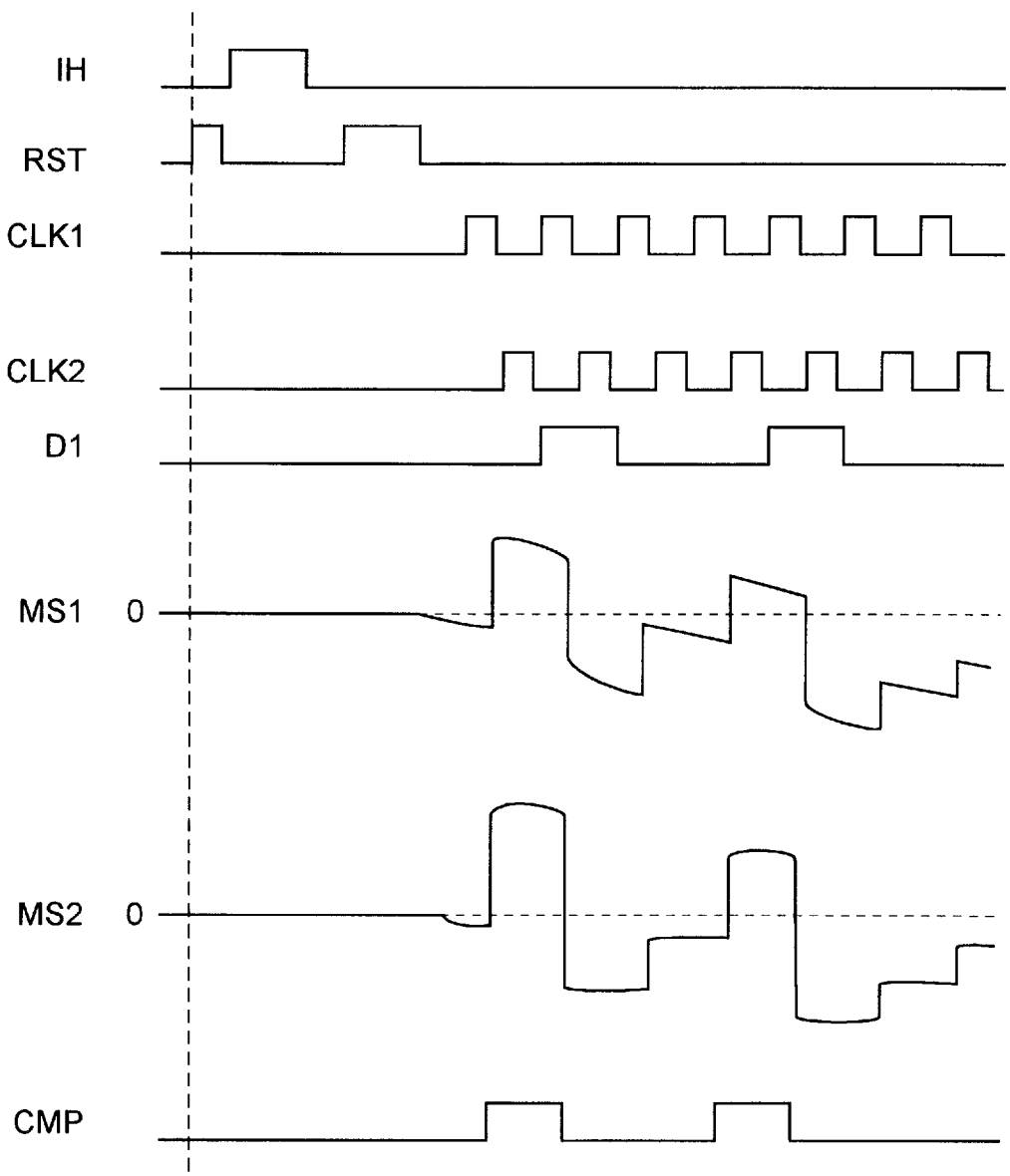
FIG. 13 is a timing chart showing the operation of the solid-state image sensing device according to the sixth embodiment of the present invention.

The solid-state image sensing device of this embodiment obtains digital data corresponding to the intensity of light by the photodiode 100 as follows. FIG. 13 is a timing chart showing the operation of the solid-state image sensing device of this embodiment.

Prior to measuring the received light amount, the dark current removing circuit 700 is set as in the fourth embodiment, and thereafter, a fundamental timing generation circuit 610 sets the reset signal RST at logical truth level to close switches 223 and 283 so as to clear the charges accumulated in feedback capacitive elements 221 and 281, and to reset the count value output from a counter 510 to zero.

Also, the circuit 610 resets a binary sampling circuit 400. As a consequence, a switch 232 is closed.

Subsequently, the circuit 610 sets the reset signal RST at logical false level, and thereafter, the intensity of light by the photodiode is measured in synchronism with clock signals CLK1 and CLK2.

Thereafter, the device operates in the same manner as in the third embodiment, and obtains an AD conversion result which is free from any influence of the offset voltage and has higher precision than in the third embodiment.

Capacitances C11 and C12 are selected in accordance with the current range of the photodiode 100 in terms of the conversion precision and speed, as in the first embodiment. Note that pairs of different types of first feedback capacitive elements and first step charge generation capacitive elements, each pair of which has a predetermined ratio between the capacitances C11 and C12, are preferably prepared to allow selection of a desired one of these pairs.

The above embodiment uses only one photodiode. Alternatively, as in the first embodiment, a plurality of photodiodes, which are arranged in a one- or two-dimensional array, may be used. In this case, a photodiode selection circuit is added to select the photodiodes in a predetermined order or random order, and thereafter, the above-mentioned operations can be executed. Also, a plurality of pairs of above-mentioned photodiodes and AD conversion units may be arranged in parallel with each other.

When an array of a plurality of solid-state image sensing devices of this embodiment is integrated on a single chip, an output selection circuit is preferably added to sequentially select and read out the outputs from the digital filter circuits in terms of the number of pins of the chip, and the circuit scale of a circuit connected to the output side of this array as in the first embodiment.

In the above embodiments, the positive input terminals of the photodiode and comparator, the non-inverting input terminal of the operational amplifier, and the first terminals of the switches 223 and 234 are connected to ground, but need only be connected to a voltage level between the reference voltage levels +Vref and −Vref.

As described in detail above, according to the solid-state image sensing device of the present invention, since a current-input ΣΔ modulator is used, and a current signal from a photodiode such as a photodiode is directly input and AD-converted without being processed, high-precision digital data can be obtained in correspondence with the received light amount of the photodiode with a simple arrangement suitable for integration without any influence of the offset voltage in the ΣΔ modulator.

Also, when two ΣΔ modulators are arranged in series with each other to execute quadratic ΣΔ modulation, precision drop factors, which result from the characteristics of the photodiode and cannot be removed by the performance of the first ΣΔ modulator, can be removed, and high-precision digital data can be obtained in correspondence with the received light amount of the photodiode.

When the dark current removing circuit is added to remove dark currents from the photodiode, and only a current signal generated upon receiving light is received by the ΣΔ modulator, digital data with higher precision can be obtained in correspondence with the received light amount of the photodiode.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 8-108250 (1996/108250) filed on Apr. 26, 1996 and No. 8-109865 (109865/1996) filed on Apr. 30, 1996 are hereby incorporated by reference.

What is claimed is:

1. A solid-state image sensing device comprising:
  a photodiode for producing a charge in correspondence with an intensity of light thereby, said photodiode having a first terminal set at a first reference voltage level and a second terminal for outputting the produced charge, and the first reference voltage level falling within a range between second and third reference voltage levels;
  a first feedback capacitive element having a first terminal which directly receives the charge output from the second terminal of said photodiode;
  a first amplifier having a signal input terminal connected to the first terminal of said first feedback capacitive element, the signal input terminal of said first amplifier being virtually set at the first reference voltage level, and an output terminal of said first amplifier being connected to a second terminal of said first feedback capacitive element;

a first step charge generator for producing a step charge on the basis of the second and third reference voltage levels, the first step charge generator supplying the step charge to said first feedback capacitive element;

a voltage comparator for receiving a first integral voltage signal output from said first amplifier, comparing a voltage of the first integral voltage signal with the first reference voltage level, and outputting a comparison result signal;

a binary sampling circuit for receiving the comparison result signal, and sampling the comparison result signal to binarize the comparison result signal; and a fundamental timing generation circuit for generating a first clock signal and a second clock signal being at logical false level when the first clock signal is at logical truth level and changing to logical truth level during a period included in a logical false level period of the first clock signal, outputting the first and second clock signals to said first step charge generator, and outputting the first clock signal to said binary sampling circuit.

2. A device according to claim 1, further comprising:

a first step charge generation control circuit for receiving an output signal from said binary sampling circuit, and outputting the output signal from said binary sampling circuit and an inverted signal of the output signal from said binary sampling circuit to said first step charge generator as a step charge generation instruction.

3. A device according to claim 2, wherein said first step charge generator comprises:

a first switch having a first terminal set at the second reference voltage level and being opened/closed in response to the output signal from said binary sampling circuit;

a second switch having a first terminal set at the third reference voltage level and being opened/closed in response to the inverted signal of the output signal from said binary sampling circuit;

a third switch having a first terminal set at the first reference voltage level and being opened/closed in response to the first clock signal;

a fourth switch having a first terminal set at the first reference voltage level and being opened/closed in response to the first clock signal;

a first step charge generation capacitive element having a first terminal connected to a second terminal of said third switch and a second terminal connected to a second terminal of said fourth switch;

a fifth switch having a first terminal connected to the first terminal of said first step charge generation capacitive element and a second terminal connected to the signal input terminal of said first amplifier, and being opened/closed in response to the second clock signal; and a sixth switch having a first terminal connected to second terminals of said first and second switches and a second terminal connected to the second terminal of said first step charge generation capacitive element, and being opened/closed in response to the second clock signal.

4. A device according to claim 1, further comprising:

a dark current removing circuit for removing a dark current of said photodiode.

5. A device according to claim 4, wherein said dark current removing circuit comprises:

a field effect transistor having a source terminal connected to the signal input terminal of said first amplifier and a drain terminal set at the first reference voltage level;

a dark current storage capacitive element having a first terminal connected to a gate terminal of said field effect transistor and a second terminal set at the first reference voltage level; and a current holding switch having a first terminal connected to the first terminal of said dark current storage capacitive element and a second terminal connected to the output terminal of said first amplifier.

6. A device according to claim 1, further comprising, between said first amplifier and said voltage comparator:

a signal sampling circuit for sampling the first integral voltage signal at an instructed timing, and outputting an AC component signal;

a feedback capacitance circuit having a second feedback capacitive element for receiving a signal output from said signal sampling circuit at a first terminal thereof;

a second amplifier for receiving the signal output from said signal sampling circuit at a signal input terminal thereof, an output terminal of said second amplifier being connected to said feedback capacitance circuit; and a second step charge generator for generating a step charge on the basis of the second and third reference voltage levels and supplying the step charge to said second feedback capacitive element, and wherein said voltage comparator receives a second integral voltage signal output from said second amplifier.

7. A device according to claim 6, further comprising:

a second step charge generation control circuit for receiving an output signal from said binary sampling circuit, and outputting the output signal from said binary sampling circuit and an inverted signal of the output signal from said binary sampling circuit to said first and second step charge generators as a step charge generation instruction.

8. A device according to claim 7, wherein said signal sampling circuit comprises:

a first switch having a first terminal connected to the output terminal of said first amplifier and being opened/closed in response to the first clock signal; and a signal transmission capacitive element having a first terminal connected to a second terminal of said first switch and a second terminal connected to the signal input terminal of said second amplifier.

9. A device according to claim 8, wherein said second step charge generator comprises:

a second switch having a first terminal set at the second reference voltage level and being opened/closed in response to the output signal from said binary sampling circuit;

a third switch having a first terminal set at the third reference voltage level, and being opened/closed in response to the inverted signal of the output signal from said binary sampling circuit; and a fourth switch having a first terminal connected to second terminals of said second and third switches and a second terminal connected to the first terminal of said signal transmission capacitive element, and being opened/closed in response to the second clock signal, and said feedback capacitance circuit comprises:
said second feedback capacitive element having the first terminal connected to the signal input terminal of said second amplifier;
a fifth switch having a first terminal connected to a second terminal of said second feedback capacitive element and a second terminal connected to the output terminal of said second amplifier, and being opened/closed in response to the first clock signal; and
a sixth switch having a first terminal connected to the signal input terminal of said second amplifier and a second terminal connected to the output terminal of said second amplifier, and being opened/closed in response to the first clock signal.

10. A device according to claim 7, wherein said signal sampling circuit comprises:
a first switch having a first terminal connected to the output terminal of said first amplifier and being opened/closed in response to the first clock signal;
a signal transmission capacitive element having a first terminal connected to a second terminal of said first switch;
a second switch having a first terminal connected to a second terminal of said signal transmission capacitive element and a second terminal connected to the signal input terminal of said second amplifier, and being opened/closed in response to the second clock signal;
a third switch having a first terminal set at the first reference voltage level and a second terminal connected to the first terminal of said signal transmission capacitive element, and being opened/closed in response to the second clock signal; and
a fourth switch having a first terminal set at the first reference voltage level and a second terminal connected to the second terminal of said signal transmission capacitive element, and being opened/closed in response to the first clock signal.

11. A device according to claim 10, wherein said second step charge generator comprises:
a fifth switch having a first terminal set at the second reference voltage level, and being opened/closed in response to the output signal from said binary sampling circuit;
a sixth switch having a first terminal set at the third reference voltage level, and being opened/closed in response to the inverted signal of the output signal from said binary sampling circuit;
a seventh switch having a first terminal set at the first reference voltage level, and being opened/closed in response to the first clock signal;
an eighth switch having a first terminal set at the first reference voltage level, and being opened/closed in response to the first clock signal;
a second step charge generation capacitive element having a first terminal connected to a second terminal of said seventh switch and a second terminal connected to a second terminal of said eighth switch;
a ninth switch having a first terminal connected to the first terminal of said second step charge generation capacitive element and a second terminal connected to the signal input terminal of said second amplifier, and being opened/closed in response to the second clock signal; and
a tenth switch having a first terminal connected to second terminals of said fifth and sixth switches and a second terminal connected to the second terminal of said second step charge generation capacitive element, and being opened/closed in response to the second clock signal, and
said feedback capacitance circuit comprises said second feedback capacitive element having the first terminal connected to the signal input terminal of said second amplifier and a second terminal connected to the output terminal of said second amplifier.

12. A device according to claim 1, further comprising:
a digital filter circuit for receiving a digital signal sequence output from said binary sampling circuit, and outputting a digitally filtered data signal.

13. A device according to claim 1, wherein capacitances of said first feedback capacitive element and said first step charge generator are selected in correspondence with time characteristics of an output current from said photodiode.

14. A device according to claim 1, wherein a plurality of photodiodes being equivalent to said photodiode, and the plurality of photodiodes being arranged in one of one- and two-dimensional arrays, and said device further comprises a selection circuit for selecting one of said photodiodes to be connected to the first terminal of said first feedback capacitive element.

15. A device according to claim 14, wherein said selection circuit selects said photodiodes in one of a predetermined order and a random order.

* * * * *